United States Patent
Ochi et al.

(10) Patent No.: US 11,639,427 B2
(45) Date of Patent: May 2, 2023

(54) METHOD FOR MANUFACTURING PREPREG, COATING DEVICE, AND APPARATUS FOR MANUFACTURING PREPREG

(71) Applicant: Toray Industries, Inc., Tokyo (JP)

(72) Inventors: Takashi Ochi, Ehime (JP); So Nishino, Otsu (JP); Kiyoshi Minoura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/861,469

(22) Filed: Jul. 11, 2022

(65) Prior Publication Data

US 2023/0106616 A1 Apr. 6, 2023

Related U.S. Application Data

(62) Division of application No. 17/264,886, filed as application No. PCT/JP2019/029607 on Jul. 29, 2019, now Pat. No. 11,421,091.

(30) Foreign Application Priority Data

Aug. 9, 2018 (JP) .............................. JP2018-150109

(51) Int. Cl.
  *C08J 5/24* (2006.01)
  *B32B 27/12* (2006.01)
  (Continued)

(52) U.S. Cl.
  CPC .............. *C08J 5/243* (2021.05); *B32B 27/12* (2013.01); *B32B 37/182* (2013.01); *B32B 38/08* (2013.01);
  (Continued)

(58) Field of Classification Search
  CPC . C08J 2363/00; C08J 5/243; B32B 2262/106; B32B 2260/046;
  (Continued)

(56) References Cited

U.S. PATENT DOCUMENTS

| 4,588,538 A | 5/1986 | Chung et al. |
| 9,238,336 B2 | 1/2016 | Ishibashi et al. |

(Continued)

FOREIGN PATENT DOCUMENTS

| EP | 0976515 A1 | 2/2000 |
| JP | 63132036 A | 6/1988 |

(Continued)

OTHER PUBLICATIONS

International Search Report and Written Opinion for International Application No. PCT/JP2019/029607, dated Oct. 29, 2019, 6 pages.

(Continued)

*Primary Examiner* — Vishal I Patel
(74) *Attorney, Agent, or Firm* — RatnerPrestia

(57) ABSTRACT

The present invention relates to a method of producing a prepreg, in which a matrix resin is applied to a reinforcing fiber sheet, where the sheet can continuously run without clogging due to generated fuzz, even at a high running speed, and where the sheet can be efficiently impregnated with the matrix resin. The prepreg is produced by a method which includes a step of allowing a reinforcing fiber sheet to pass horizontally or slantingly through the inside of a coating section storing a matrix resin to apply the matrix resin to the reinforcing fiber sheet, where the coating section includes a liquid pool and a narrowed section which are in communication with each other, where the liquid pool has a portion whose cross-sectional area decreases continuously along a running direction of the reinforcing fiber sheet, and wherein the narrowed section has a slit-like cross-section (Continued)

and has a smaller cross-sectional area than the largest cross-sectional area of the liquid pool.

5 Claims, 16 Drawing Sheets

(51) Int. Cl.
    *B32B 37/18*     (2006.01)
    *B32B 38/08*     (2006.01)
    *C08K 3/04*     (2006.01)
    *C08K 7/06*     (2006.01)

(52) U.S. Cl.
    CPC ................. *C08K 3/04* (2013.01); *C08K 7/06* (2013.01); *B32B 2260/021* (2013.01); *B32B 2260/046* (2013.01); *B32B 2262/106* (2013.01); *C08J 2363/00* (2013.01)

(58) Field of Classification Search
    CPC . B32B 2260/021; B32B 38/08; B32B 37/182; B32B 27/12; C08K 7/06; C08K 3/04
    See application file for complete search history.

(56) References Cited

U.S. PATENT DOCUMENTS

| | | |
|---|---|---|
| 9,410,004 B2 | 8/2016 | Asano et al. |
| 9,434,811 B2 | 9/2016 | Arai et al. |
| 2015/0344649 A1 | 12/2015 | Sequeira |
| 2016/0303777 A1 | 10/2016 | Miyauchi et al. |
| 2017/0129155 A1* | 5/2017 | Tashiro ............... B29C 48/2883 |

FOREIGN PATENT DOCUMENTS

| | | | |
|---|---|---|---|
| JP | 01104624 A | 4/1989 | |
| JP | 01178412 A | 7/1989 | |
| JP | 10337516 A | 12/1998 | |
| JP | 3252278 B2 | 2/2002 | |
| JP | 2011132389 A | 7/2011 | |
| JP | 2011162619 A | 8/2011 | |
| JP | 2012016857 A | 1/2012 | |
| JP | 2013022868 A | 2/2013 | |
| JP | 2015022799 A | 2/2015 | |
| JP | 2016510077 A | 4/2016 | |
| JP | 2016083923 A | 5/2016 | |
| JP | 2016203397 A | 12/2016 | |
| JP | 2017154330 A | 9/2017 | |
| WO | 0128951 A2 | 4/2001 | |
| WO | 2005002819 A2 | 1/2005 | |
| WO | 2009142231 A1 | 11/2009 | |
| WO | 2010150022 A1 | 12/2010 | |
| WO | 2011118106 A1 | 9/2011 | |
| WO | 2012002417 A1 | 1/2012 | |
| WO | 2015060299 A1 | 4/2015 | |
| WO | 2015076981 A1 | 5/2015 | |
| WO | 2017068159 A1 | 4/2017 | |

OTHER PUBLICATIONS

Kawabe, K., "New Spreading Technology for Carbon Fiber Tow and Its Application to Composite Materials", Sen'i Gakkaishi, vol. 64, No. 8, 2008, pp. 262-267 is not in the English language, but cited English language publication WO2005002819 is provided herein, which lists Kazumasa Kawabe, author of the reference, as co-inventor, and covers similar subject matter to that described in the reference.

Entire patent prosecution history of U.S. Appl. No. 17/264,886, filed Feb. 1, 2021, entitled, "Method for Manufacturing Prepreg, Coating Device, and Apparatus for Manufacturing Prepreg.".

* cited by examiner (a) Whole Liquid Pool (b) Narrowed Section and its Vicinity

METHOD FOR MANUFACTURING PREPREG, COATING DEVICE, AND APPARATUS FOR MANUFACTURING PREPREG

CROSS REFERENCE TO RELATED APPLICATIONS

This is a Divisional Application of U.S. application Ser. No. 17/264,886, filed Feb. 1, 2021, which is the U.S. National Phase application of PCT/JP2019/029607, filed Jul. 29, 2019, which claims priority to Japanese Patent Application No. 2018-150109, filed Aug. 9, 2018, the disclosures of these applications being incorporated herein by reference in their entireties for all purposes.

FIELD OF THE INVENTION

The present invention relates to a method of producing a prepreg, and particularly relates to a method of producing a prepreg by impregnating a reinforcing fiber sheet with a matrix resin uniformly.

BACKGROUND OF THE INVENTION

Fiber reinforced composite materials (FRP) in which a matrix resin containing a thermoplastic resin or a thermosetting resin is reinforced with a reinforcing fiber are used in various fields such as aerospace materials, automobile materials, industrial 5 materials, pressure vessels, construction materials, housings, medical applications, and sports applications. Carbon fiber reinforced materials (CFRP) are widely and suitably used particularly in cases where high mechanical property and lightness are required. On the other hand, in some of the cases where cost has priority over a mechanical property and lightness, glass fiber reinforced composite materials (GFRP) are used. FRP is obtained by impregnating a reinforcing fiber bundle with a matrix resin to obtain an intermediate base material, which is laminated and formed, and further thermally cured if a thermosetting resin is used, and members composed of FRP are then produced. In the above-mentioned applications, planar objects or objects formed by folding planar objects are often used, and two-dimensional sheet-like objects are more widely used as intermediate base materials of FRP than one-dimensional strands and roving-like objects, from the viewpoint of lamination efficiency and moldability achieved in producing such members.

In addition, an attempt to enhance production efficiency for members composed of FRP has recently promoted the mechanization and automation of lamination of sheet-like intermediate base materials, and here, narrow tape-like intermediate base materials are suitably used. Narrow tape-like intermediate base materials can be obtained by slicing broad sheet-like intermediate base materials into tapes having a desired width or impregnating a narrow reinforcing fiber sheet directly with matrix resins.

A two-dimensional sheet-like intermediate base material that is commonly used is prepreg. Prepreg is produced by providing and/or impregnating a reinforcing fiber with a matrix resin. Examples of reinforcing fiber sheets include: a unidirectional material (UD base material) in which a plurality of reinforcing fibers are unidirectionally arranged in planar form; and a reinforcing fiber fabric formed by arranging reinforcing fibers multiaxially or randomly into a sheet.

A hot-melt process that is one of the methods of producing prepregs is a method in which a matrix resin is melted and then applied onto release paper sheets, a laminated structure is produced in which a reinforcing fiber sheet is sandwiched between the matrix resin sheets at the upper side and lower side of the reinforcing fiber sheet, and then, the inside of the reinforcing fiber sheet is impregnated with the matrix resin by heat and pressure. There is a problem in that this method has many steps, cannot increase the production speed, and is costly.

For more efficient impregnation, for example, Patent Literature 1 has made a proposition. This is a method in which glass fiber is melted and spun, and the resulting spinning bundled in strand form or roving form is allowed to pass through a liquid pool filled with a thermoplastic resin and having a conical flow path.

As another example, Patent Literature 2 describes a method in which a coating film is formed on both faces of a sheet-like object simultaneously, but this is a method in which a sheet-like object is allowed to pass through a web-guide and coated using a pipe type doctor blade in order to prevent fluctuation of the sheet-like object in the formation of the coating film.

As a method of producing strip-like prepreg using a thermoplastic resin, a horizontal type pultrusion method is known in which a strip-like reinforcing fiber bundle is conveyed in the horizontal direction (cross direction) and is allowed to pass through a die, where the strip-like reinforcing fiber bundle is provided and impregnated with a thermoplastic resin (Patent Literature 3). Patent Literature 3 explains that a plurality of strip-like reinforcing fiber bundles are separately introduced into a die filled with molten thermoplastic resin, opened, impregnated, and laminated using a fixed guide (for example, a squeeze bar), and finally withdrawn from the die as one sheet of prepreg.

Patent Literature 4 describes a device that causes ultrasonic vibration at the outlet of a manifold in a pultrusion method in which the manifold is filled with a thermoplastic resin, from which a reinforcing fiber bundle is pultruded longitudinally.

PATENT LITERATURE

Patent Literature 1: WO2001/028951
Patent Literature 2: JP10-337516A
Patent Literature 3: WO2012/002417
Patent Literature 4: JP01-178412A

SUMMARY OF INVENTION

The method in Patent Literature 1 enables only a strand-like or roving-like object to be produced, and is not applicable to producing a sheet-like prepreg at which the present invention is directed. In addition, Patent Literature 1 explains that, in order to enhance impregnation efficiency, a thermoplastic resin fluid is allowed to strike against a side of the strand-like or roving-like reinforcing fiber bundle to actively generate turbulence in a conical flow path. This is considered to be intended to disturb part of the arrangement of the reinforcing fiber bundle so that the matrix resin can flow in, but applying this idea to a reinforcing fiber sheet conceivably causes the reinforcing fiber sheet to be deformed, resulting in not only degrading the grade of the prepreg but also decreasing the mechanical property of FRP.

In addition, if the technology of Patent Literature 2 is applied, abrasion at the web-guide generates fuzz, conceivably making it difficult for the reinforcing fiber sheet to run. In addition, the technology of Patent Literature 2 is intended for coating with resin, not for impregnation.

In addition, the method of Patent Literature 3 makes it more likely that fuzz is retained in a liquid pool during continuous production and that the fuzz clogs a pultrusion portion. There is a problem in that, in particular, running a strip-like reinforcing fiber bundle continuously at a high speed causes the frequency of clogging with fuzz to be very high, and accordingly, enables production to be carried out only at a very low speed and fails to increase productivity.

In a method described in Patent Literature 4, a nozzle portion filled with no resin is disposed in the portion above a manifold. The nozzle can be optimized with a strand or a roving-form object but does not easily cope with a planar shape such as of a reinforcing fiber sheet. While passing through this nozzle, a reinforcing fiber sheet generates fuzz, which is conceivably more likely to clog a die when brought into the manifold.

Thus, none of an efficient method of applying a matrix resin to a reinforcing fiber sheet and an efficient method of producing a prepreg has been established yet.

An object of the present invention relates to a method of producing a prepreg, and is to provide a production method and a coating device for a prepreg, wherein generation of fuzz is suppressed, continuous production is possible without clogging with fuzz, a reinforcing fiber sheet is efficiently impregnated with a matrix resin, and the production speed can be made higher.

The above-mentioned problem is solved by a method of producing a prepreg according to the present invention, the method characterized by including a step of allowing a reinforcing fiber sheet to pass horizontally or slantingly through the inside of a coating section storing a matrix resin to apply the matrix resin to the reinforcing fiber sheet; wherein the coating section includes a liquid pool and a narrowed section which are in communication with each other, wherein the liquid pool has a portion whose cross-sectional area decreases continuously along a running direction of the reinforcing fiber sheet, and wherein the narrowed section has a slit-like cross-section and has a smaller cross-sectional area than the largest cross-sectional area of the liquid pool; and wherein the width L at the ends of the liquid pool and the width W of the sheet-like reinforcing fiber bundle at the outlet of the narrowed section satisfy the relationship of the below-mentioned Formula (1).

$$L \leq W + 10 \text{(mm)} \tag{1}$$

In addition, a coating device according to the present invention is a coating device for applying a matrix resin to a reinforcing fiber sheet, the coating device characterized by including: a running mechanism which allows the reinforcing fiber sheet to run horizontally or slantingly, and a coating mechanism; wherein said coating mechanism is capable of storing a matrix resin in the inside thereof, and further includes a liquid pool and a narrowed section which are in communication with each other, wherein said liquid pool has a portion whose cross-sectional area decreases continuously along a running direction of said reinforcing fiber sheet, and wherein said narrowed section has a slit-like cross-section and has a smaller cross-sectional area than the largest cross-sectional area of the liquid pool.

Furthermore, a prepreg production apparatus according to the present invention is characterized by including: a rack on which a reinforcing fiber or a reinforcing fiber fabric is hung; the above-mentioned coating device; and a winder for winding up a prepreg.

The method of producing a prepreg according to the present invention makes it possible to significantly suppress and prevent clogging with fuzz. Furthermore, the method enables the reinforcing fiber sheet to be run continuously at a high speed, and enhances the productivity of the prepreg.

DETAILED DESCRIPTION OF EMBODIMENTS OF THE INVENTION

Preferred embodiments of the present invention will be described with reference to the drawings. In this regard, the following description illustrates embodiments of the present invention, the present invention is not to be construed to be limited to the embodiments, and various modifications can be made to the invention to the extent that they do not depart from the object and effect of the present invention.

<Outline of Method of Producing Prepreg>

Figure 1:
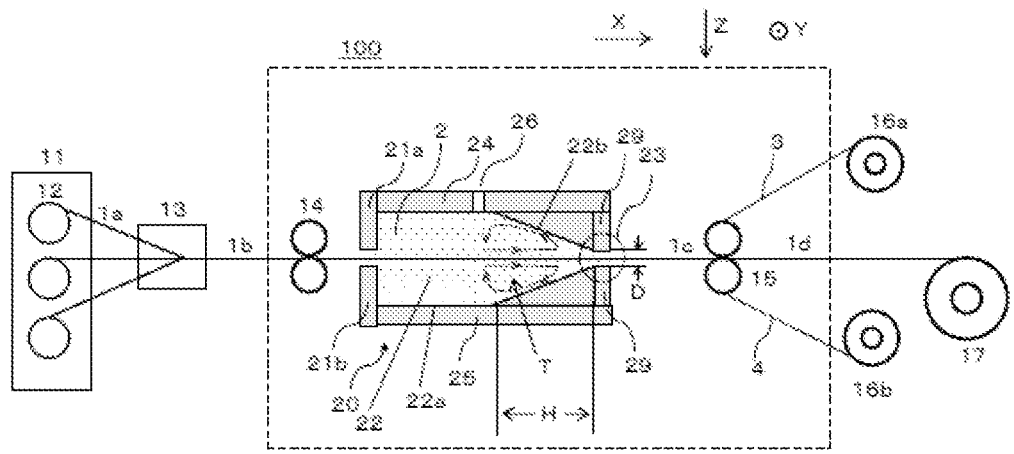
FIG. 1 is a schematic cross-sectional view depicting a production method and coating device for a prepreg according to one embodiment of the present invention.

First, the outline of the method of producing a prepreg according to the present invention will be described with reference to FIG. 1. FIG. 1 is a schematic cross-sectional view depicting a method and apparatus for producing a prepreg according to one embodiment of the present invention. A coating device 100 includes: conveyance rolls 14 and 15 as a running mechanism for running a reinforcing fiber sheet 1b horizontally or slantingly; and a coating section 20 that is disposed between the conveyance rolls 14 and 15 and stores a matrix resin 2. The matrix resin may itself be fluid, or may contain a solvent, a plasticizer, or the like to obtain fluidity. Also before and after the coating device 100, it is possible to provide a plurality of creels 11 for unwinding reinforcing fibers 1a, an arrangement device 13 for obtaining a reinforcing fiber sheet 1b in which the unwound reinforcing fibers 1a are arranged unidirectionally (arranged in the depth direction of the page in FIG. 1), and a wind-up device 17 for a prepreg 1d, and in addition, the coating device 100 is equipped with a monitoring means for the amount of the matrix resin and a supply device for the matrix resin, though neither the monitoring means nor the supply device is shown in the drawing (as in the other examples). Furthermore, the coating device 100 includes a supply device 16a for supplying a release sheet 3 and a supply device 16b for supplying a resin film 4.

<Reinforcing Fiber Sheet>

Here, examples of reinforcing fibers include carbon fibers, glass fibers, metal fibers, metal oxide fibers, metal nitride fibers, organic fibers (aramide fibers, polybenzoxazole fibers, polyvinyl alcohol fibers, polyethylene fibers, polyester fibers, polyamide fibers, and the like), and the like, and carbon fibers are preferably used, from the viewpoint of the mechanical property and lightness of FRP.

Examples of reinforcing fiber sheets include: a unidirectional material (UD base material) in which a plurality of reinforcing fibers are unidirectionally arranged in planar form; and a reinforcing fiber fabric formed by arranging reinforcing fibers multiaxially or randomly into a sheet.

The UD base material is not limited to any particular forming method, and may be formed using a known method. It is preferable from the viewpoints of process efficiency and arrangement uniformity to preliminarily arrange single fibers to form a reinforcing fiber bundle, followed by further arranging the reinforcing fiber bundle to form a reinforcing fiber sheet. For example, in the case of carbon fiber, a "tow" that is a tape-like reinforcing fiber bundle is wound on a bobbin, and a reinforcing 5 fiber sheet can be obtained by arranging the tape-like reinforcing fiber bundle withdrawn from the bobbin. In addition, it is preferable to have a reinforcing fiber arrangement mechanism for orderly arranging reinforcing fiber bundles withdrawn from the bobbins fit onto the creels so that there can be no undesirable overlapping nor folding in the reinforcing fiber bundles in the reinforcing fiber sheet and no split between the reinforcing fiber bundles. As a reinforcing fiber arrangement mechanism, a known roller, a comb type of arrangement device, or the like can be used. In addition, layering a plurality of preliminarily arranged reinforcing fiber sheets is useful from the viewpoint of decreasing gaps between the reinforcing fibers. In this regard, the creels are preferably provided with a tension control mechanism operated when the reinforcing fibers are withdrawn. As a tension control mechanism, a known one can be used, and examples thereof include a braking mechanism. In addition, tension can also be controlled, for example, by adjusting a yarn guide.

On the other hand, specific examples of reinforcing fiber fabrics include not only woven fabrics, knitted fabrics, and the like but also two-dimensionally and multiaxially arranged reinforcing fibers and randomly oriented reinforcing fibers such as non-woven fabrics, mats, and paper. In this case, the reinforcing fiber can be formed into a sheet by utilizing a method such as binder-providing, confounding, welding, or fusing. Examples of woven fabrics that can be used include not only basic fabric structures such as plain weaves, twill, satin, and non-crimp fabrics but also bias structures, leno weaves, multiaxially woven fabrics, multi-woven fabrics, and the like. In a woven fabric formed by combining a bias structure and a UD base material, not only the UD structure inhibits the woven fabric from being deformed by a tension in a matrix resin application (referred to as coating in some cases) process and an impregnating process, but also the bias structure also causes quasi-isotropy, and thus, is a preferable form. In addition, a multi-woven fabric is advantageous in that the upper face and/or lower face of the woven fabric and the structure and properties of the inside of the woven fabric can be designed separately. A preferable knitted fabric is warp knitting taking into consideration the shape stability in the coating/impregnating process, and it is also possible to use braid which is circular knitting.

Among these, a UD base material is preferably used in cases where the mechanical property of FRP is prioritized, and a UD base material can be produced by a known method of arranging reinforcing fibers unidirectionally in sheet form.

<Smoothing of Reinforcing Fiber Sheet>

In the present invention, increasing the surface smoothness of the reinforcing fiber sheet can enhance the uniformity of the amount of the matrix resin applied in the coating section. For this reason, the reinforcing fiber sheet is preferably introduced into the liquid pool after it is smoothed. The smoothing treatment method is not limited to a particular one, and examples thereof include a method in which physical pressure is applied using opposing rolls or the like and a method in which reinforcing fibers are moved using air flow. A method in which physical pressure is applied is easy and convenient, less likely to disturb the arrangement of the reinforcing fibers, and accordingly preferable. More specifically, calendering or the like can be used. The method in which air flow is used not only is less likely to cause abrasion but also has the effect of widening a reinforcing fiber sheet, and accordingly, is preferable.

<Widening of Reinforcing Fiber Sheet>

In the present invention, it is also preferable from the viewpoint of enabling a thin prepreg to be produced efficiently that the reinforcing fiber sheet is introduced into the liquid pool after it is treated for widening of the fiber bundle. The treatment method of widening of the fiber bundle is not limited to a particular one, and examples thereof include a method in which vibration is applied mechanically, a method in which the reinforcing fiber bundle is expanded using air flow, and the like. Examples of methods in which vibration is applied mechanically include a method in which a reinforcing fiber sheet is brought in contact with vibrating rolls, as described, for example, in JP 2015-22799 A. As to the vibration direction, vibration is preferably applied in the Y-axis direction (horizontal direction) or the Z-axis direction (vertical direction), assuming that the running direction of the reinforcing fiber sheet is the X-axis. It is also preferable to use a combination of the horizontally vibrating rolls and the vertically vibrating rolls. In addition, providing a plurality of projections on the surface of the vibration roll makes it possible to suppress abrasion of the reinforcing fiber on the roll, and accordingly is preferable. As a method in which air flow is used, for example, a method described in SEN-I GAKKAISHI, vol. 64, P-262-267 (2008) can be used.

<Preheating of Reinforcing Fiber Sheet>

In the present invention, introducing the reinforcing fiber sheet into the liquid pool after heating the sheet suppresses a decrease in the temperature of the matrix resin and enhances the viscosity uniformity of the matrix resin, and accordingly, is preferable. The reinforcing fiber sheet is preferably heated up to or to the vicinity of the temperature of the matrix resin, and examples of various heating means that can be used for this purpose include air heating, infrared heating, far-infrared heating, laser heating, contact heating, heat medium heating (steam), and the like. Among others, an infrared heating device is easy and convenient and can directly heat the reinforcing fiber sheet, and accordingly, can achieve efficient heating up to a desired temperature even at a high running speed, and is preferable.

<Matrix Resin>

A matrix resin used in the present invention can be used as a resin composition containing any of the below-mentioned various resins, particles, hardeners, and further containing any of various kinds of additives. A prepreg obtained according to the present invention is in a state in which a reinforcing fiber sheet is impregnated with a matrix resin, and the reinforcing fiber sheet can be directly laminated and molded as a sheet-like prepreg to afford members composed of FRP. The degree of impregnation can be controlled in accordance with the design of the coating section and through an additional-impregnation process carried out after the matrix resin is applied. A matrix resin can suitably be selected in accordance with the application, and a thermoplastic resin or thermosetting resin is generally used. The matrix resin may be a molten resin melted by heating or a matrix resin which is a matrix resin at room temperature. In addition, the matrix resin may be formed into a solution or varnish using a solvent.

Examples of matrix resins that can be used include matrix resins generally used for FRP, such as thermoplastic resins, thermosetting resins, and photo-curable resins. If these are liquids at room temperature, they may be directly used. If they are solids or viscous liquids at room temperature, they may be heated to decrease the viscosity, may be melted to be used as a melt, or may be dissolved in a solvent to be used as a solution or varnish.

Examples of thermoplastic resins that can be used include polymers having, in the main chain, a bond selected from a carbon-carbon bond, an amide bond, an imide bond, an ester bond, an ether bond, a carbonate bond, a urethane bond, a urea bond, a thioether bond, a sulfone bond, an imidazole bond, and a carbonyl bond. Specific examples include polyacrylate, polyolefin, polyamide (PA), aramid, polyester, polycarbonate (PC), polyphenylenesulfide (PPS), polybenzimidazole (PBI), polyimide (PI), polyetherimide (PEI), polysulfone (PSU), polyethersulfone (PES), polyetherketone (PEK), polyetheretherketone (PEEK), polyetherketoneketone (PEKK), polyaryletherketone (PAEK), polyamideimide (PAI), and the like. In fields requiring heat resistance, such as aircraft applications, PPS, PES, PI, PEI, PSU, PEEK, PEKK, PEAK, and the like are suitable. On the other hand, in industrial and automobile applications, PA, polyester, PPS, a polyolefin such as polypropylene (PP), and the like are suitable in order to increase molding efficiency. These may be polymers, or oligomers or monomers may be used, because of the low viscosity and low temperature coating. Needless to say, these may be copolymerized depending on the purpose, or various kinds of them can be mixed to be used as polymer blends or a polymer alloys.

Examples of thermosetting resins include epoxy resins, maleimide resins, polyimide resins, resins having an acetylene terminal, resins having a vinyl terminal, resins having an allyl terminal, resins having a nadic acid terminal, and resins having a cyanate ester terminal. These can be used generally in combination with a hardener or a curing catalyst. In addition, these thermosetting resins can suitably be used in mixture.

As thermosetting resins suitable for the present invention, epoxy resins are suitably used in that epoxy resins have excellent heat resistance, chemical resistance, and mechanical property. In particular, amines, phenols, and epoxy resins whose precursor is a compound having a carbon-carbon double bond are preferable. Specific examples include, but are not limited to: epoxy resins whose precursors are amines, such as various isomers of tetraglycidyl diaminodiphenylmethane, triglycidyl-p-aminophenol, triglycidyl-m-aminophenol, and triglycidylaminocresol; epoxy resins whose precursors are phenols, such as bisphenol A epoxy resins, bisphenol F epoxy resins, bisphenol S epoxy resins, phenol novolac epoxy resins, and cresol novolac epoxy resins; epoxy resins whose precursors are compounds having a carbon-carbon double bond, such as alicyclic epoxy resins; and the like. Bromated epoxy resins resulting from bromating these epoxy resins are also used. Epoxy resins whose precursors are aromatic amines and which are typified by tetraglycidyl diaminodiphenylmethane are most suitable for the present invention because the epoxy resins have good heat resistance and good adhesiveness to reinforcing fibers.

Thermosetting resins are preferably used in combination with hardeners. For example, for epoxy resins, a hardener can be used if the hardener is a compound having an active group capable of reacting with an epoxy group. Preferably, compounds having an amino group, an acid anhydride group, or an azido group are suitable. Specifically, various isomers of dicyandiamide and diaminodiphenyl sulfone are, and amino benzoic acid ester types are, suitable. According to specific description, dicyandiamide provides excellent storage stability of prepreg, and accordingly, is used by preference. In addition, various isomers of diaminodiphenyl sulfone afford cured objects having good heat resistance, and accordingly, are most suitable for the present invention. As amino benzoic acid ester types, trimethyleneglycol di-p-aminobenzoate and neopentylglycol di-p-aminobenzoate are used by preference and have lower heat resistance but have excellent tensile strength, compared with diaminodiphenyl sulfone, and accordingly, are used selectively in accordance with the application. Needless to say, a curing catalyst can also be used, if necessary. In addition, a hardener or a curing catalyst and a complexing agent capable of forming a complex can be used together, from the viewpoint of enhancing the pot life of a matrix resin.

In the present invention, a mixture of a thermosetting resin and a thermoplastic resin is also suitably used. A mixture of a thermosetting resin and a thermoplastic resin affords better results than a thermosetting resin used singly. This is because a thermosetting resin and a thermoplastic resin have antimonic characteristics: that is, a thermosetting resin is generally disadvantageouly brittle but can be molded at low pressure in an autoclave, and contrarily, a thermoplastic resin is generally advantageously tough but difficult to mold at low pressure in an autoclave, and accordingly, using these in mixture can effect a balance between properties and moldability. Such a mixture to be used preferably contains more than 50 mass % thermosetting resin, from the viewpoint of the mechanical property of FRP obtained by curing prepreg.

<Polymer Particle>

In the present invention, it is also possible to allow the matrix resin or the resin film to contain inorganic particles or organic particles. The type of such inorganic particles can be selected in accordance with the purpose, and is not limited to any particular type. From the view point of affording electrical conductivity, heat transfer properties, thixotropy, and/or the like, examples of inorganic particles that can be suitably used include carbon-based particles, boron nitride particles, titanium dioxide particles, silicon dioxide particles, and the like. The type of such organic particles can also be selected in accordance with the purpose, and is not limited to any particular type. In particular, use of polymer particles can enhance the toughness, impact resistance, and damping performance of the resulting FRP, and thus, is preferable. In this case, the glass transition temperature (Tg) or melting temperature (Tm) of polymer particles which is 20° C. or more higher than the temperature of a matrix resin makes it easier to retain the form of the polymer particle in the matrix resin, and accordingly is preferable. The Tg of polymer particles can be measured under the following conditions using a temperature-modulated DSC. As a temperature-modulated DSC device, Q1000 manufactured by TA Instruments, Inc. is suitable, and this can be used on the basis of calibration carried out using high-purity indium under a nitrogen atmosphere. The measurement conditions can be based on a temperature ramp rate of 2° C./minute, and the temperature-modulation condition can be based on a cycle of 60 seconds and an amplitude of 1° C. The reversible components are separated from the total heat flow obtained under these conditions, and the temperature at the midpoint of the step signal can be regarded as Tg.

In addition, Tm can be measured using a common DSC at a temperature ramp rate of 10° C./minute, and the temperature at the peak top of the peak-shaped signal corresponding to melting is regarded as Tm.

In addition, the polymer particles are preferably insoluble in a matrix resin, and as such polymer particles, suitable ones described in, for example, WO2009/142231 as a reference can be used. More specifically, polyamides and polyimides can be preferably used, and polyamides that have excellent toughness and accordingly can significantly enhance the impact resistance are most preferable. Examples of polyamides that can be suitably used include polyamide 12, polyamide 11, polyamide 6, polyamide 66, polyamide 6/12 copolymers, and a polyamide modified to have a semi IPN (macromolecular interpenetrating network structure) with an epoxy compound (semi IPN polyamide) described in Example 1 of JP01-104624A. As to the shape of this thermoplastic resin particle, the particle may be a spherical particle, a nonspherical particle, or a porous particle, and the spherical shape is particularly preferable in the production method according to the present invention in order not to decrease the resin flow property. In addition, the spherical shape is a preferable aspect in that the spherical shape has no starting point for stress concentration and affords high impact resistance.

Examples of commercially available polyamide particles that can be used include SP-500, SP-10, TR-1, TR-2, 842P-48, 842P-80 (which are all manufactured by Toray Industries, Inc.), "Orgasol (registered trademark)" 1002D, 2001UD, 2001EXD, 2002D, 3202D, 3501D, 3502D (which are all manufactured by Arkema K. K.), "Grilamid (registered trademark)" TR90 (manufactured by Emser Werke, Inc.), "TROGAMID (registered trademark)" CX7323, CX9701, CX9704 (manufactured by Degussa AG), and the like. These polyamide particles may be used singly or in combination of two or more kinds thereof.

In addition, polymer particles are preferably retained in the interlayer resin layer in the reinforcing fiber of FRP in order to impart high toughness to the interlayer resin layer in the reinforcing fiber. For this, the number average particle size of the polymer particles is preferably in the range from 5 to 50 µm, more preferably in the range from 7 to 40 µm, still more preferably in the range from 10 to 30 µm. Having a number average particle size of 5 µm or more makes it possible that the particles do not intrude into the reinforcing fiber bundle, but are retained in the interlayer resin layer in the reinforcing fiber of the obtained fiber reinforced composite material. Having a number average particle size of 50 µm or less makes it possible that the thickness of the matrix resin layer on the surface of the prepreg is made suitable, and eventually that the fiber mass content in the obtained FRP is made suitable.

<Viscosity of Matrix Resin>

A matrix resin used in the present invention preferably has an optimal viscosity selected from the viewpoint of processability and stability. Specifically, it is preferable to have a viscosity in the range from 1 to 60 Pa·s because such a viscosity makes it possible that a drip of the liquid at the outlet of the narrowed section is suppressed and that the high-speed running properties and stable running properties of the reinforcing fiber sheet are enhanced. As used herein, a viscosity refers to one measured at a strain rate of 3.14 s$^{-1}$ at a matrix resin temperature in the liquid pool. As a measurement device, a viscoelasticity measurement device such as of a parallel disc type or a conical type can be used. The viscosity of the matrix resin is more preferably 5 to 30 Pa·s.

<Application Step of Matrix Resin>

Taking a UD base material for an example of a reinforcing fiber sheet, an application step of a matrix resin will be described with reference to FIG. 1. The method of providing the reinforcing fiber sheet 1b with the matrix resin 2 in the coating device 100 according to the illustration in FIG. 1 is a method in which a plurality of the reinforcing fibers 1a unwound from the creels 11 are arranged unidirectionally (in the depth direction of the page) through the arrangement device 13 to obtain the reinforcing fiber sheet 1b, and then, the reinforcing fiber sheet 1b is allowed to pass through the coating section 20 in the horizontal direction to provide both faces of the reinforcing fiber sheet 1b with the matrix resin 2. Thus, a primary impregnate prepreg 1c can be obtained. Needless to say, the primary impregnate prepreg itself also corresponds to a prepreg mentioned in the present invention. Here, the horizontal direction is indicated as the direction X in FIG. 1. In the present invention, the reinforcing fiber sheet can be allowed to pass in the slanting direction, or the slanting running direction and the horizontal running direction can be combined, as below-mentioned. The slanting direction refers to a direction intermediate between the horizontal direction and the vertical direction. More specifically, the horizontal direction or the slanting direction can be defined as being within the range of from −80° to +80° with respect to 0° as the horizontal plane. Defining the running direction of the reinforcing fiber sheet in the narrowed section in the coating section as a range of from −30° to +30° with respect to 0° as the horizontal plane makes it possible to incorporate such a device into an existing prepreg production apparatus, and thus, is preferable from the viewpoint of the versatility of facilities. The running direction of the reinforcing fiber sheet in the narrowed section in the coating section is more preferably −15° to +15° with respect to 0° as the horizontal plane. In the below-mentioned FIG. 29 and others, the reinforcing fiber sheet is described as being introduced into the coating section in the slantingly downward direction, and in addition, being allowed to run in the vertically slanting direction when running through the diverting members in the coating section, but the running direction of the reinforcing fiber sheet is horizontal in the portion whose cross-sectional area decreases continuously and in the narrowed section. In addition, introducing the reinforcing fiber sheet 1b horizontally with respect to the coating section 20, as in FIG. 1, causes the running pathway of the reinforcing fiber sheet 1b to be linearized, thus making it more unlikely to generate disturbance in the reinforcing fiber sheet 1b depending the thickness of the reinforcing fiber sheet 1b, and thus, is preferable. In such a case, it is preferable to have a sealing mechanism so that the matrix resin 2 cannot leak out through a portion at which the reinforcing fiber sheet 1b is introduced into the coating section 20.

The coating section 20 includes outlet side members 29 opposed to each other and having a predetermined gap D therebetween, and also includes wall constituent members 21a and 21b at the introduction side for the reinforcing fiber sheet 1b and the outlet side members 29 at the outlet side. A liquid pool 22 and a slit-like narrowed section 23 are formed between an upper-side member 24 and a lower-side member 25, wherein the narrowed section is positioned on the outlet side of the liquid pool 22 and has a smaller cross-sectional area than the largest cross-sectional area of the liquid pool 22.

In the coating section 20, the reinforcing fiber sheet 1b introduced into the liquid pool 22 runs in the horizontal direction, and, at the same time, is accompanied by the matrix resin 2 surrounding the reinforcing fiber sheet. During this, the accompanying matrix resin 2 is gradually compressed in the portion 22b whose cross-sectional area in the liquid pool 22 decreases continuously in the running direction of the reinforcing fiber sheet 1b, and thus, the pressure of the matrix resin 2 increases toward the outlet of the liquid pool 22. When the pressure in the outlet region of the liquid pool 22 increases, it is more difficult for the accompanying liquid flow to flow toward the outlet any further, and the accompanying liquid flows toward the upper-side member 24 and the lower-side member 25, and then impeded by the upper-side member 24 and the lower-side member 25, resulting in flowing in the direction opposite to the running direction of the reinforcing fiber sheet 1b. As a result, a circular stream T is formed along the plane of the reinforcing fiber sheet 1b and the wall surfaces of the upper-side member 24 and the lower-side member 25 in the liquid pool 22. Thus, even if the sheet-like reinforcing fiber 1b brings fuzz in the liquid pool 22, the fuzz moves along the circular stream T, and cannot approach the outlet region of the liquid pool 22, where the liquid pressure is higher, or the narrowed section 23. When the reinforcing fiber sheet 1b is run at a high speed, the liquid pressure further increases, and accordingly, further enhances the effect of preventing the fuzz from approaching the outlet region and the narrowed section 23. As a result, this makes it possible to provide the reinforcing fiber sheet 1b with the matrix resin 2 at a higher speed, and enhances productivity significantly.

In addition, the increased liquid pressure has the effect of making it easier for the reinforcing fiber sheet 1b to be impregnated with the matrix resin 2. This is based on the property (Darcy's law) according to which the degree at which a porous object such as a reinforcing fiber bundle is impregnated with a matrix resin is increased by the pressure of the matrix resin. This can also enhance the impregnation effect because running the reinforcing fiber sheet 1b at a higher speed increases the liquid pressure further. In this regard, the reinforcing fiber sheet 1b is impregnated with the matrix resin 2 through gas-liquid replacement with bubbles remaining in the reinforcing fiber sheet 1b, and the above-mentioned circular stream T and the ascending force cause the bubbles to gather more on or near the boundary between the portion 22a whose cross-sectional area does not decrease and the portion 22b whose cross-sectional area decreases continuously. Because of this, a degassing mechanism 26 for degassing the bubbles from the matrix resin 2 is preferably disposed in this vicinity. More specifically, the position at which the degassing mechanism is disposed is preferably in the range of 5 cm or less from the boundary between the portion 22a whose cross-sectional area does not decrease and the portion 22b whose cross-sectional area decreases continuously. In this regard, Patent Literature 3 describes an impregnation process carried out with a plurality of fixed guides, conceivably causing bubbles to be generated over a broad range, and a degassing mechanism is not necessarily disposed in the vicinity of the guides, posing the possibility that the bubbles are not sufficiently removed.

Further, the increased liquid pressure allows the reinforcing fiber sheet 1b to be automatically aligned with the center of the gap D, and the reinforcing fiber sheet 1b is not directly abraded against the wall surfaces of the liquid pool 22 and the narrowed section 23, whereby the effect of suppressing the generation of fuzz here is also achieved. This is because, when any external disturbance or the like causes the reinforcing fiber sheet 1b to approach either side in the gap D, the matrix resin 2 is pushed and compressed in the resulting narrower gap on the approached side, and accordingly, the liquid pressure further increases on the approached side, pushing the reinforcing fiber sheet 1b back to the center of the gap D.

The narrowed section 23 is designed to have a smaller cross-sectional area than the largest cross-sectional area of the liquid pool 22. As understood from FIG. 1, the smaller cross-sectional area is simply due to the fact that the length in the direction perpendicular to the pseudo-plane of the reinforcing fiber sheet 1b is smaller, that is, the distance between the members is narrower. This is intended to achieve the impregnation and the automatic alignment effect through increasing the liquid pressure in the narrowed section 23 as above-mentioned. In addition, the cross-sectional shape of the inlet of the narrowed section 23 is preferably made to conform to the cross-sectional shape of that face of the liquid pool 22 which is in contact with the inlet, from the viewpoint of the running properties of the reinforcing fiber sheet 1b and the flow control of the matrix resin 2, but, if necessary, the cross-sectional shape of the inlet of the narrowed section 23 may be made slightly larger.

In this respect, the reinforcing fiber sheet 1b in the coating section 20 in FIG. 1 runs in the completely horizontal direction, but, without limitation to this, may run in the slanting direction in the coating section 20 to the extent that the fuzz collection effect and the bubbles discharge effect can be obtained, and that the reinforcing fiber sheet 1b can run stably and continuously. Alternatively, it is possible to slant the coating section 20.

In addition, the total amount of the matrix resin 2 applied to the reinforcing fiber sheet 1b can be controlled in the gap D in the narrowed section 23. For example, in cases where the total amount of the matrix resin 2 applied to the reinforcing fiber sheet 1b is desired to be larger (the areal weight is desired to be larger), it is only necessary to make an adjustment to widen the gap D.

FIG. 1 depicts one reinforcing fiber sheet being introduced into the coating section in the horizontal direction, but the introduction of the reinforcing fiber sheet into the coating section is not limited to this. If necessary, a plurality of reinforcing fiber sheets may be introduced, and the introduction direction may be slanting. This will be described with reference to FIGS. 2 to 4.

Figure 2:
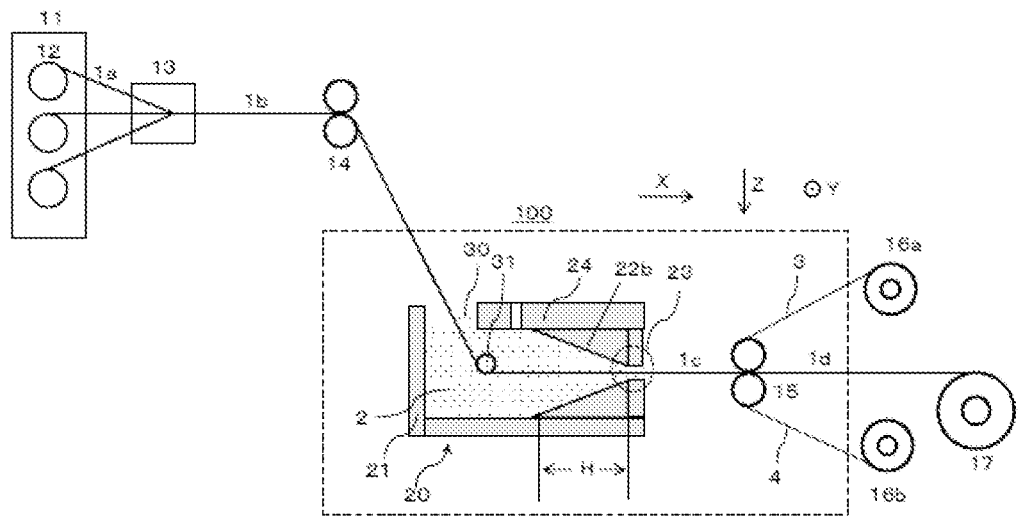
FIG. 2 is a schematic cross-sectional view depicting a production method and coating device for a prepreg according to another embodiment of the present invention.

In FIG. 2, one reinforcing fiber sheet 1b runs from above in the slantingly downward direction, and is introduced into the coating section 20 through the opening 30. Then, the running direction of the reinforcing fiber sheet 1b is diverted to the horizontal direction by a diverting member 31, and withdrawn through the narrowed section 23. Introducing the reinforcing fiber sheet in the slantingly downward direction through the upper portion of the coating section is a convenient method that can prevent the matrix resin stored in the coating section from leaking, and thus, is preferable. Specifically, disposing the opening 30 in the upper portion of the coating section eliminates the necessity to provide a special sealing mechanism, thus making it possible to simplify the device. Obviously, it is also possible to include a sealing mechanism at the opening in accordance with the various cases of necessity, for example, filling the liquid pool with inert gas. In addition, the diverting member 31 preferably has a structure at least such that the face thereof brought in contact with the reinforcing fiber sheet 1b is curved. In addition, the diverting member 31 is preferably fixed from the viewpoint of preventing the reinforcing fiber sheet 1b from winding around. Taking these into consideration, the diverting member 31 is preferably a fixed bar having a curved face, and examples of the cross-sectional shape of the member include a circle, ellipse, saddle shape, and the like. In addition, the portion at which the diverting member 31 is brought in contact with the reinforcing fiber sheet 1b may have a curved face and a plane face in mixture, and having a curved face at the starting part and ending part of contact with the reinforcing fiber sheet 1b makes it possible to inhibit fuzz generation, and thus, is preferable. Furthermore, particularly in cases where the running speed is made higher, the diverting member 31 can also be a rotatable roller from the viewpoint of inhibiting the reinforcing fiber sheet 1b from chafing against the diverting member 31.

Figure 4:
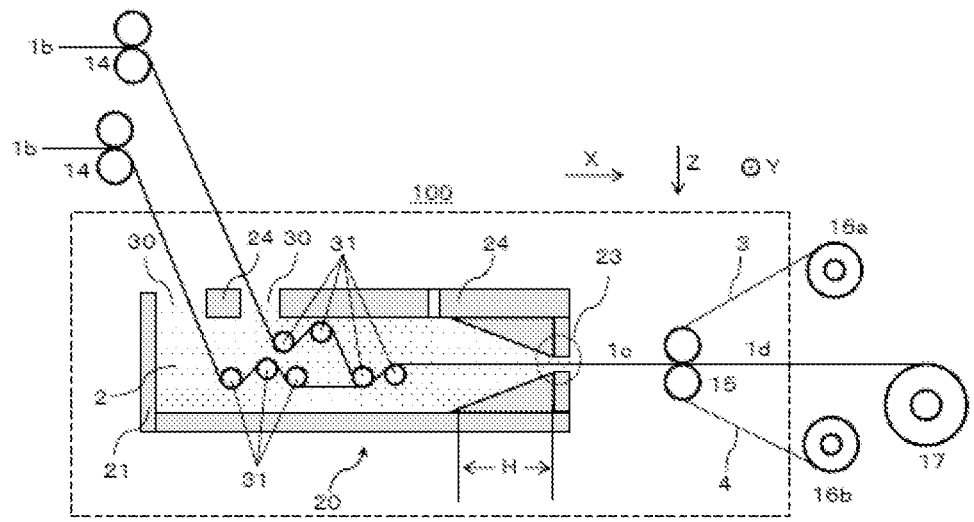
FIG. 4 is a schematic cross-sectional view depicting a production method and coating device for a prepreg according to another embodiment of the present invention.

In addition, the reinforcing fiber sheet 1b is pressed against the diverting member 31, and thus, in some cases, the gas in the reinforcing fiber sheet 1b is replaced with the matrix resin 2, whereby the sheet is impregnated. In particular, as shown in FIG. 4, pressing the sheet against a plurality of diverting members 31 at angles makes it possible to advance impregnation efficiently.

In addition, the position at which the diverting member 31 is disposed is preferably 1 cm or more toward the portion 22a whose cross-sectional area does not decrease and from the boundary between the portion 22a whose cross-sectional area does not decrease and the portion 22b whose cross-sectional area decreases continuously, from the viewpoint of not impeding the circular stream T.

Figure 3:
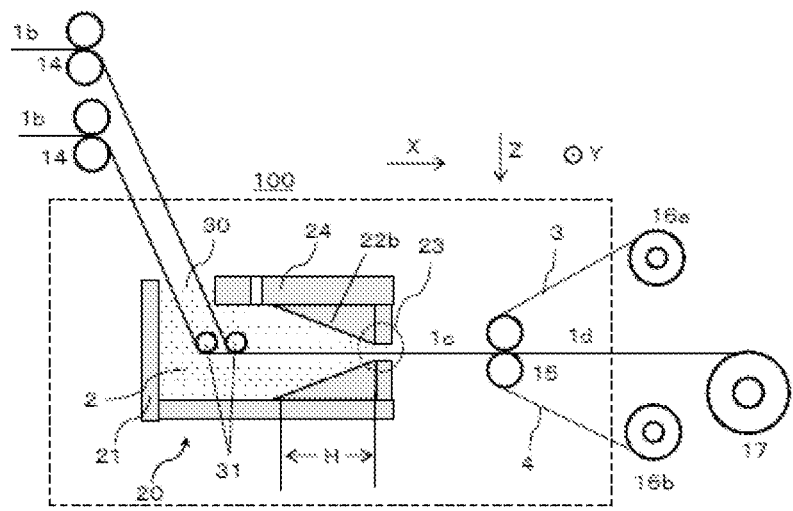
FIG. 3 is a schematic cross-sectional view depicting a production method and coating device for a prepreg according to another embodiment of the present invention.

In FIG. 3, two reinforcing fiber sheets 1b run from above in the slantingly downward direction, and are introduced into the coating section 20 through the opening 30. Then, the running direction of the two reinforcing fiber sheets 1b is diverted to the horizontal direction by the diverting members 31, and the two sheets are laminated and then withdrawn through the narrowed section 23. When this takes place, the two reinforcing fiber sheets 1b are laminated with the matrix resin 2 contained therebetween, making it easier to advance impregnation in the portion 22b whose cross-sectional area decreases continuously and in the narrowed section 23, and thus, is preferable.

In addition, the further the reinforcing fiber sheets 1b laminated with the matrix resin 2 sandwiched therebetween move toward the outlet, the higher the liquid pressure in the portion 22b whose cross-sectional area decreases continuously, and thus, the further the impregnation with the matrix resin 2 is advanced, causing the surplus matrix resin 2 to be squeezed out of the reinforcing fiber sheet 1b laminate, and making it possible to inhibit the laminate from swelling excessively in the thick direction. This makes it possible that the reinforcing fiber sheet 1b laminate is withdrawn through the narrowed section 23 without getting stuck in the thickness direction. This effect is remarked particularly when the running speed is high. For this purpose, it is important that the liquid pressure is gradually increased in the portion 22b whose cross-sectional area decreases continuously. More specifically, the length H of the portion 22b whose cross-sectional area decreases continuously is preferably 10 mm or more, more preferably 30 mm or more, from the viewpoint of inhibiting the reinforcing fiber sheet 1b laminate from swelling excessively in the thick direction. If the portion 22b whose cross-sectional area decreases continuously does not exist, the reinforcing fiber sheet 1b laminate containing the matrix resin 2 therein and having an excessive swell in the thick direction is introduced into the narrowed section 23 rapidly, and thus, the surplus matrix resin 2 cannot be discharged out, and causes the laminate to easily get stuck in cases where the laminate is thicker than the spacing of the gap D. In addition, if the length H of the portion 22b which decreases continuously is less than 10 mm, the thickness of the reinforcing fiber sheet 1b laminate can be decreased in cases where the running speed of the reinforcing fiber sheet 1b is sufficiently low, but in cases where the running speed is made higher, the effect is insufficient, still making it more likely that the laminate gets stuck. As above-mentioned, the length H of 30 mm or more makes it possible to increase the running speed up to 20 m/minute or more.

In addition, the length C (see FIG. 14) of the liquid pool can be shortened in a range which enables the reinforcing fiber sheet to run, and specifically, the length is preferably 400 mm or less from the viewpoint of decreasing the volume of the liquid pool. It is more preferably 200 mm or less.

In FIG. 4, two reinforcing fiber sheets 1b run from above in the slantingly downward direction, and are introduced into the coating section 20 through the opening 30. Then, the two reinforcing fiber sheets 1b are each impregnated while passing through a plurality of diverting members 31, and finally, the two sheets are laminated and then withdrawn through the narrowed section 23. In such a case, the shape and number of the diverting members 31 for advancing impregnation can be selected variously in accordance with the purpose. In addition, the contact length between the diverting member 31 and the reinforcing fiber sheet 1b and the angle (wrap angle) formed between both ends of the contact portion and the center of the diverting member 31 can be selected in accordance with the purpose.

FIGS. 3 and 4 show an example in which two reinforcing fiber sheets 1b are used, but obviously, the number of sheets can be optionally 3 or more.

Figure 5:
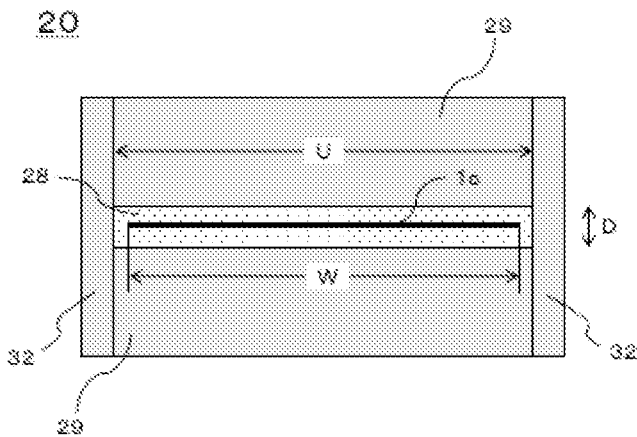
FIG. 5 is a cross-sectional view depicting the structure of the outlet of the coating section 20 in FIG. 1, as viewed in the direction opposite to X in FIG. 1.

FIG. 5 is a view of the coating section 20, as viewed in the direction opposite to X in FIG. 1. In the coating section 20, side wall members 32 are provided to prevent the matrix resin 2 from leaking by both ends of the reinforcing fiber sheet 1b in the arrangement direction, and the outlet 28 of the narrowed section 23 is formed in the space surrounded by the outlet side members 29 and the side wall members 32. Here, the outlet 28 is slit-like, and the cross-sectional aspect ratio (U/D in FIG. 5) may be set in accordance with the shape of the reinforcing fiber sheet 1b which is desired to be provided with the matrix resin 2.

Figure 6:
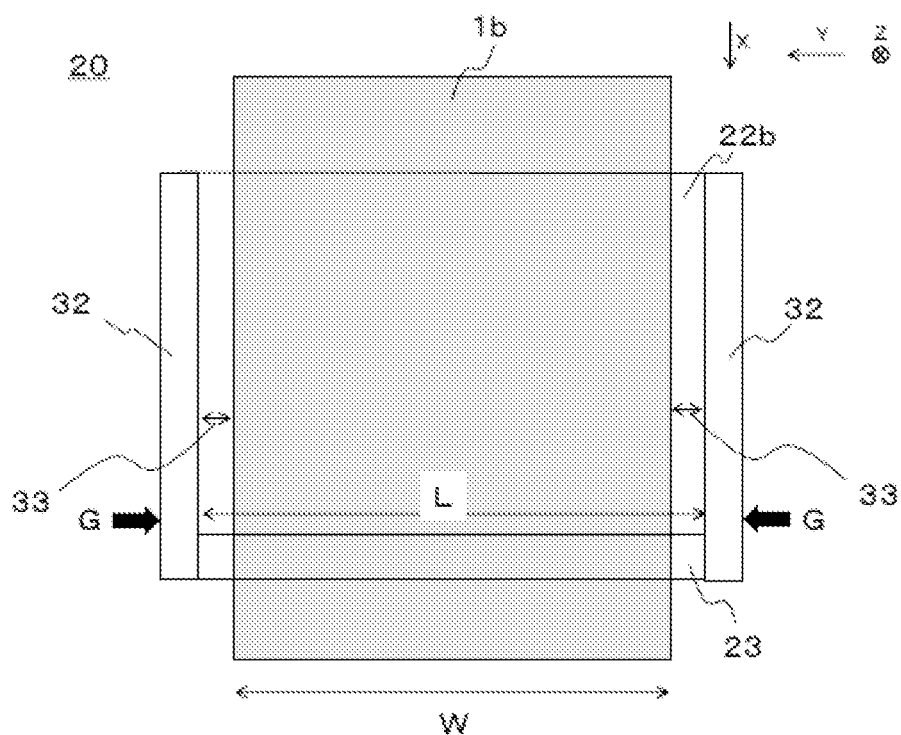
FIG. 6 is a cross-sectional view depicting the structure of the inside of the coating section 20 in FIG. 1, as viewed in the direction Z in FIG. 1.

FIG. 6 is a cross-sectional view depicting the structure of the inside of the coating section 20, as viewed in the direction Z. Here, the upper-side member 24 is omitted so that the drawing can be easier to see.

Figure 7:
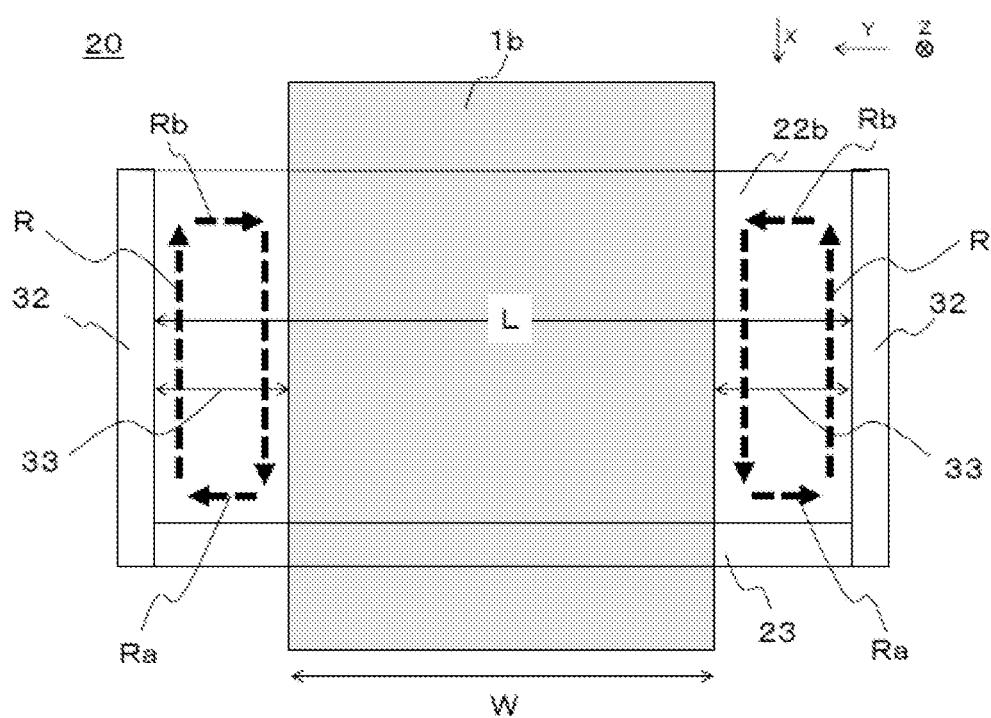
FIG. 7 is a cross-sectional view depicting the circular stream of the matrix resin 2 in the clearance gap 33 in FIG. 6.

FIG. 7 depicts the circular stream of the matrix resin 2 in the clearance gap 33 between the reinforcing fiber sheet 1b and the side wall member 32. When the clearance gap 33 between the reinforcing fiber sheet 1b and the side wall member 32 is large, a circular stream in the edge is generated in the direction of R in the matrix resin 2. In the liquid pool 22, this circular stream R in the edge becomes an outward flow (Ra) on or near the boundary between the portion 22b whose cross-sectional area decreases continuously and the narrowed section 23, and accordingly, the circular stream flows in the direction which causes the reinforcing fiber sheet to be torn apart (causing splits in the sheet-like reinforcing fiber bundles), in cases where the reinforcing fiber sheet is formed of arranged reinforcing fiber bundles (sheet-like reinforcing fiber bundles). This causes the distance between the reinforcing fibers to be expanded, thus posing the possibility that arrangement nonuniformity is caused in the reinforcing fibers in the resulting prepreg. On the other hand, the circular stream R in the liquid pool 22 becomes an inward flow (Rb) on or near the boundary between the portion 22a whose cross-sectional area does not decrease and the portion 22b whose cross-sectional area decreases continuously, and accordingly, the reinforcing fiber sheet 1b is compressed in the width direction, resulting in edge folding of the reinforcing fiber sheet in some cases. In a device, such as typified by Patent Literature 2 (JP3252278B2), for coating both faces of an integrated sheet-like base material (particularly, a film) with a matrix resin, such a circular stream as caused in the edge in the clearance gap 33 between the reinforcing fiber sheet 1b and the side wall member 32 affects the quality insignificantly, and accordingly, has attracted no attention.

In view of this, it is important in the present invention to carry out width regulation for decreasing the clearance gap 33 between the reinforcing fiber sheet 1b and the side wall member 32 to inhibit the generation of the circular stream in the edge. Specifically, it is important that the width L in the direction Y of the portion 22b whose cross-sectional area decreases continuously in the liquid pool 22, that is, the distance L between the right and left side wall members 32 is adapted to satisfy the relationship of the below-mentioned Formula (1) with the width W of the reinforcing fiber sheet 1b measured at the outlet of the narrowed section 23.

$$L \leq W + 10 \text{(mm)} \tag{1}$$

That is, the spacing L (the width of the end of the liquid pool; however, the width of the end of the liquid pool in cases where those faces of the right and left side wall members which form the liquid pool are not parallel) between the right and left side wall members 32 and the width W of the sheet-like reinforcing fiber bundle at the outlet of the narrowed section are made to satisfy the relationship of the above-mentioned Formula (1).

This suppresses the generation of a circular stream in the edge and makes it possible to suppress split and edge folding of the reinforcing fiber sheet 1b and to obtain the prepreg 1d in which the reinforcing fibers are uniformly arranged over the full width (W) of the prepreg 1b and which is of high grade and has high stability. Furthermore, this technology applied to a prepreg can not only enhance the grade and quality of the prepreg but also enhance the mechanical property and quality of FRP obtained using the prepreg. The relationship between L and W is more preferably $L \leq W+2$ (mm), and thus, the split and edge folding of the reinforcing fiber sheet can further be suppressed.

In addition, it is preferable to make adjustments so that the lower limit of L is equal to or greater than W−5 (mm), from the viewpoint of enhancing the uniformity of the dimension in the width direction of the prepreg 1d.

In this regard, this width regulation is preferably positioned at least at G (FIG. 6) on the outlet side of the portion 22b whose cross-sectional area decreases continuously, from the viewpoint of suppressing the generation of the circular stream R in the edge due to a high liquid pressure on the outlet side of the portion 22b whose cross-sectional area decreases continuously. Furthermore, this width regulation is more preferably provided in the whole region of the portion 22b whose cross-sectional area decreases continuously, more preferably in the whole region of the liquid pool 22, whereby the generation of the circular stream R in the edge can be suppressed substantially completely, and, as a result, the splitting and edge folding of the reinforcing fiber sheet can be suppressed substantially completely.

In addition, the width regulation may be provided only in the liquid pool 22 if it is provided only from the viewpoint of suppressing the circular stream in the edge in the clearance gap 33 between the reinforcing fiber sheet 1b and the side wall member 32, but it is preferable to provide the width regulation also to the narrowed section 23 in the same way, from the viewpoint of suppressing excessive application of the matrix resin 2 to the sides of the primary impregnate prepreg 1c.

<Width Regulation Mechanism>

Figure 8:
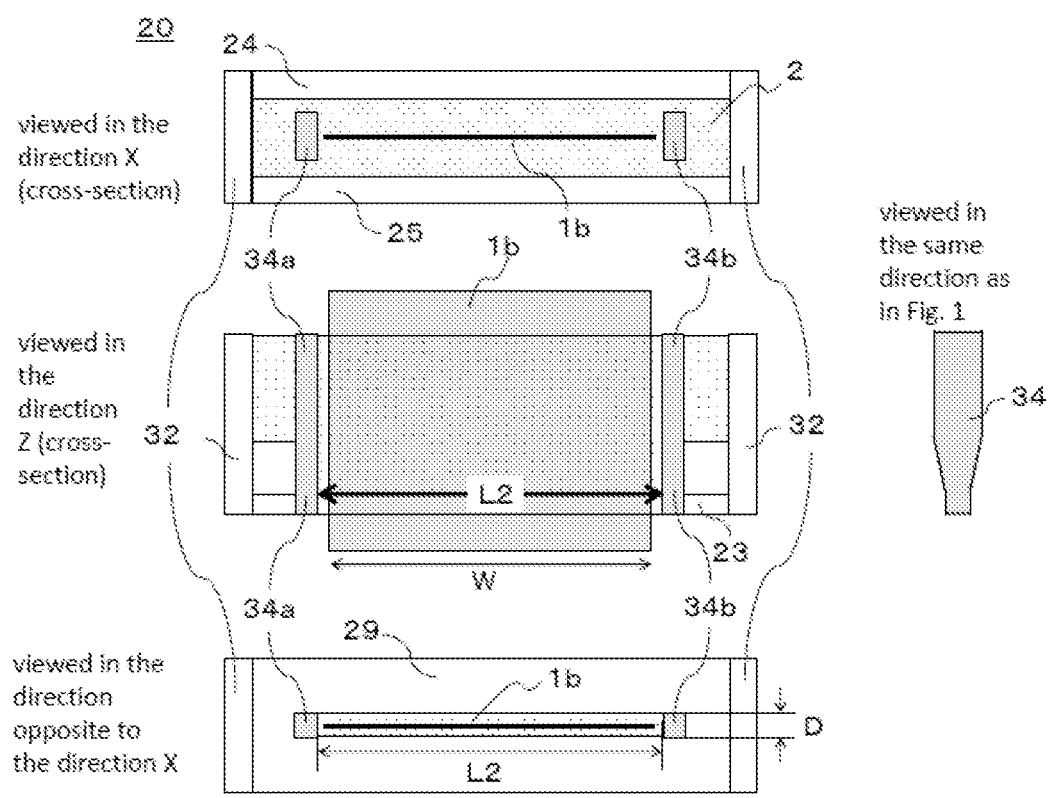
FIG. 8 is a view depicting an installation example of a width regulation mechanism.

The above-mentioned has described a case where the side wall members 32 serve for the purpose of width regulation, but, as shown in FIG. 8, it is also possible to provide width regulation mechanisms 34a and 34b between the side wall members 32 and to provide width regulation using such mechanisms. This is preferable because the capability to freely change the width regulated by the width regulation mechanisms makes it possible to use one coating section to produce different prepregs having various widths. Here, the relationship between the width (W) of the reinforcing fiber sheet 1b at the outlet of the narrowed section 23 and the width (L2) regulated by the width regulation mechanisms at the outlet side end of the width regulation mechanisms is preferably L2≤W+10 (mm), more preferably L2≤W+2 (mm). In addition, it is preferable to make adjustments so that the lower limit of L2 is equal to or greater than W−5 (mm), from the viewpoint of enhancing the uniformity of the dimension in the width direction of the prepreg 1d.

In cases where a width regulation mechanism is used, L in the above-mentioned Formula (1) is regarded as L2.

The shape and material of the width regulation mechanism are each not limited to a particular one, and a plate-like bush type is easy and convenient, and accordingly, preferable. In addition, allowing the width regulation mechanism to have a width slightly smaller than the distance between the upper-side member 24 and the lower-side member 25 (as seen in FIG. 8, the width refers to the vertical length of the width regulation mechanisms 34a and 34b in the view "viewed in the direction X") is preferable because such a width makes it possible not to impede the horizontal flow of the matrix resin 2. On the other hand, the shape from the middle portion to the outlet side end of the width regulation mechanism is preferably in conformity to the internal shape of the liquid pool 22 because such conformity makes it possible to suppress the retention of the matrix resin 2 in the liquid pool and suppress the degradation of the matrix resin 2. In this sense, the width regulation mechanism 34 is preferably inserted into the narrowed section 23. FIG. 8 shows an example of a plate-like bush as the width regulation mechanism, and shows an example in which the width regulation mechanism is inserted into the narrowed section 23, and in which the portion from the middle of the bush toward the outlet side conforms to the tapered shape of the portion 22b whose cross-sectional area decreases continuously. FIG. 8 shows an example in which L2 is constant to the outlet from the boundary region between the portion 22a whose cross-sectional area does not decrease and the portion 22b whose cross-sectional area decreases continuously, but the width to be regulated may vary depending on the site to the extent that the purpose of the width regulation mechanism is fulfilled. The width regulation mechanism can be fixed in the coating section 20 by an arbitrary method, and fixing the mechanism of a plate-like bush type at a plurality of sites in the running direction of the reinforcing fiber sheet 1b can make it possible to suppress variation of the regulation width due to the deformation of the plate-like bush caused by a high liquid pressure.

<Shape of Liquid Pool>

As described above in detail, it is important in the present invention that allowing the cross-sectional area to decrease continuously in the running direction of the reinforcing fiber sheet 1b in the liquid pool 22 increases the liquid pressure in the running direction of reinforcing fiber sheet, and here, the shape of the cross-sectional area decreasing continuously in the running direction of the reinforcing fiber sheet is not limited to a particular one as long as the shape allows the liquid pressure to increase continuously in the running direction. The shape may be a tapered (linear) one or show a curved form such as a trumpet shape in the cross-sectional view of the liquid pool. In addition, the cross-sectional area decreasing portion may be continuous over the full length of the liquid pool, or the liquid pool may contain a part in which the cross-sectional area does not decrease or contrarily increases, to the extent that the object and effect of the present invention can be achieved. These will be described in detail below with reference to FIGS. 9 to 12. Here, FIGS. 9 to 12 show the outlet region, and the region at which the reinforcing fiber sheet 1b is introduced and a degassing mechanism are omitted.

Figure 9:
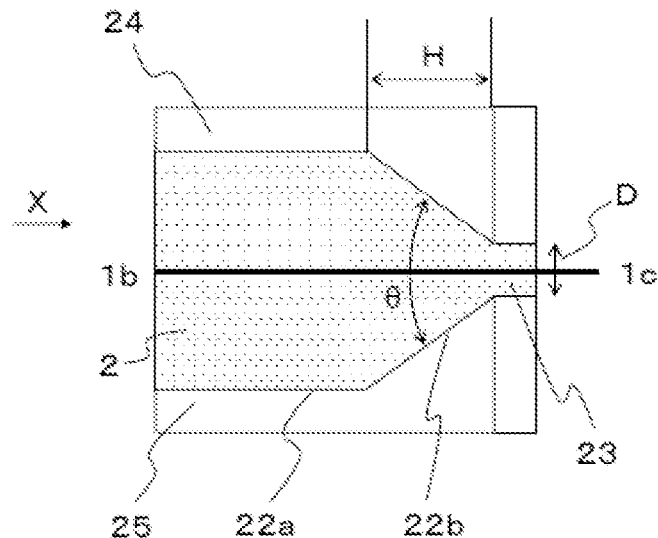
FIG. 9 is a detailed cross-sectional view of the outlet region of the coating section 20 according to the embodiment in FIG. 1.

FIG. 9 is a detailed cross-sectional view of the coating section 20 in FIG. 1. In cases where the portion 22b whose cross-sectional area decreases continuously in the liquid pool 22 is tapered, the smaller the opening angle θ of the taper, the more preferable, and specifically, the angle is preferably an acute angle (90° or less). θ is more preferably 30° or less. This makes it possible that the effect of compressing the matrix resin 2 in the portion 22b (tapered portion) whose cross-sectional area decreases continuously in the liquid pool 22 is enhanced, and that a high liquid pressure is made easier to obtain.

Figure 10:
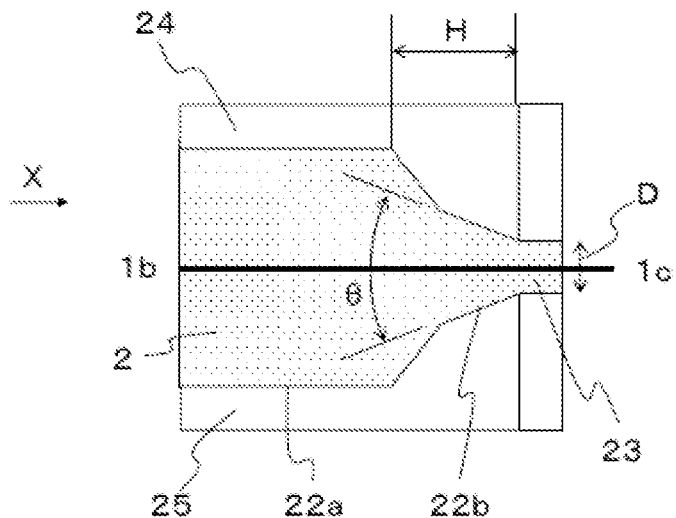
FIG. 10 is a detailed cross-sectional view of the outlet region of the coating section 20b according to an embodiment other than in FIG. 9.

FIG. 10 is a detail cross-sectional view of the coating section 20b according to an embodiment other than in FIG. 9. The coating section 20b is the same as the coating section 20 in FIG. 9 except that the portion 22b whose cross-sectional area decreases continuously is in the form of a two-tier taper. In this manner, the portion 22b whose cross-sectional area decreases continuously in the liquid pool 22 may be constituted by a multi-tier tapered portion composed of two or more tiers. In this respect, the opening angle θ of the tapered portion nearest the narrowed section 23 is preferably an acute angle, from the viewpoint of enhancing the above-mentioned compression effect. Also in this case, the length H of the portion 22b whose cross-sectional area decreases continuously in the liquid pool 22 is preferably 10 mm or more. The length H of the portion 22b whose cross-sectional area decreases continuously is more preferably 30 mm or more. Having a multi-tier tapered portion as the portion 22b whose cross-sectional area decreases continuously in the liquid pool 22, as in FIG. 10, makes it possible to maintain the volume of the matrix resin 2 that can be stored in the liquid pool 22, and at the same time, to decrease the angle θ of the tapered portion nearest the narrowed section 23. This increases the liquid pressure caused at the outlet of the liquid pool 22, and can further enhance the fuzz elimination effect and the impregnation effect of the matrix resin 2.

Figure 11:
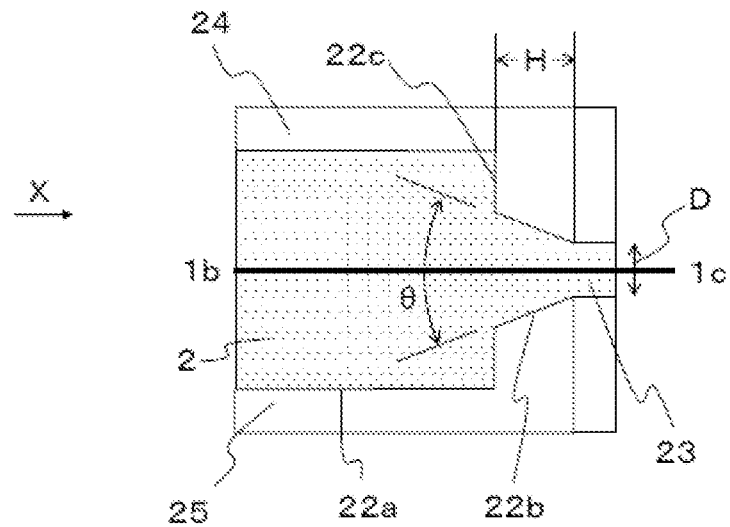
FIG. 11 is a detailed cross-sectional view of the outlet region of the coating section 20c according to an embodiment other than in FIG. 9.

FIG. 11 is a detailed cross-sectional view of the coating section 20c according to an embodiment other than in FIG. 9. The coating section 20c is the same as the coating section 20 in FIG. 9 except that the portion 22b whose cross-sectional area decreases continuously is in the form of tiers. In this manner, allowing the portion nearest the outlet of the liquid pool 22 to have the portion 22b whose cross-sectional area decreases continuously makes it possible to obtain the effect of increasing the liquid pressure, wherein the effect is an object of the present invention, and accordingly, the other part of the liquid pool 22 may include a portion 22c whose cross-sectional area decreases intermittently.

Figure 12:
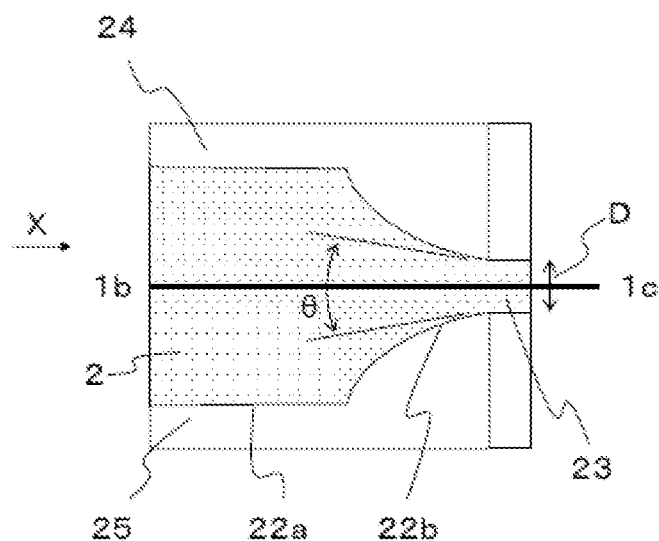
FIG. 12 is a detailed cross-sectional view of the outlet region of the coating section 20d according to an embodiment other than in FIG. 9.

FIG. 12 is a detailed cross-sectional view of the coating section 20d according to an embodiment other than in FIG. 9. The coating section 20d is the same as the coating section 20 in FIG. 9 except that the portion 22b whose cross-sectional area decreases continuously is in the form of a trumpet (a curve). In the coating section 20 in FIG. 9, the portion 22b whose cross-sectional area decreases continuously in the liquid pool 22 is tapered (linear), but, without limitation to this, may be, for example, in trumpet shape (curved shape) as in FIG. 12. However, the portion 22b whose cross-sectional area decreases continuously and the narrowed section 23 are preferably connected smoothly. This is because any step at this boundary causes the reinforcing fiber sheet 1b to be caught by the step, where fuzz will undesirably be generated. In cases where, in this manner, the portion 22b whose cross-sectional area decreases continuously in the liquid pool 22 is in trumpet shape, the opening angle θ between the virtual tangent lines on the portions nearest to the outlet of the portion 22b whose cross-sectional area decreases continuously in the liquid pool 22 is preferably an acute angle.

In this regard, the above description illustrates an example in which the cross-sectional area decreases smoothly, but the cross-sectional area of the liquid pool in the present invention does not necessarily need to decrease smoothly, to the extent that the object of the present invention is not impaired.

Figure 13:
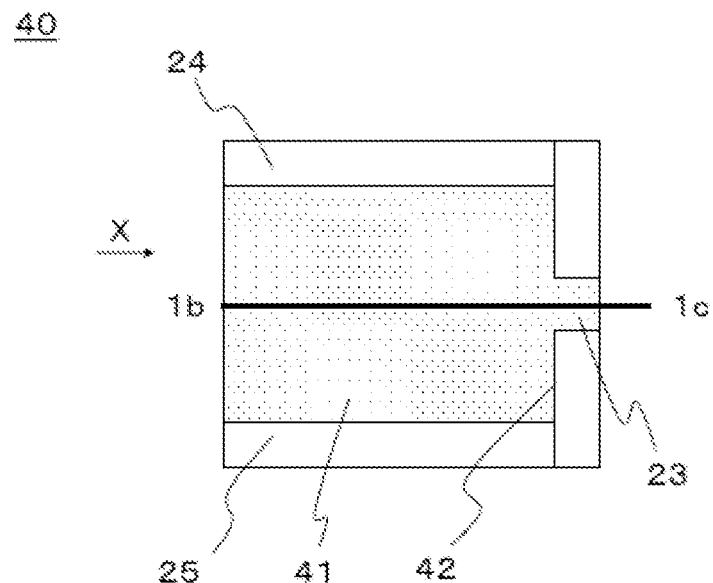
FIG. 13 is a detailed cross-sectional view of the outlet region of the coating section 40 according to an embodiment other than of the present invention.

FIG. 13 is a detailed cross-sectional view of the coating section 40 according to an embodiment other than of the present invention. Differently from an embodiment of the present invention, the liquid pool 41 in FIG. 13 does not contain a portion whose cross-sectional area decreases continuously in the running direction (direction X) of the reinforcing fiber sheet, but the liquid pool is configured such that the cross-sectional area decreases discontinuously and suddenly at the boundary 42 with the narrowed section 23. This makes it more likely that the reinforcing fiber sheet 1b causes clogging.

Figure 14:
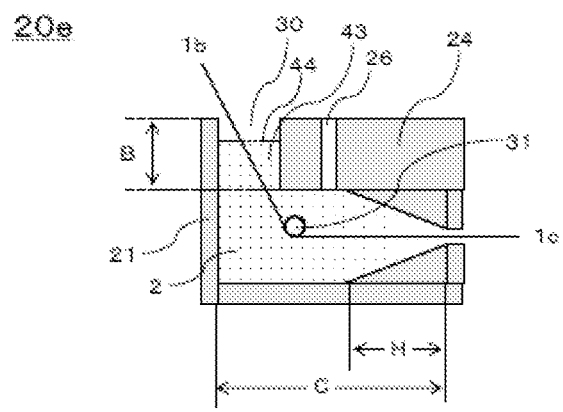
FIG. 14 is a detailed cross-sectional view of the coating section 20e according to an embodiment other than in FIG. 9.

In cases where the matrix resin stored in the liquid pool is likely to alter owing to heat or the like, the volume of the liquid pool is preferably as small as possible from the viewpoint of the quality stability of the resulting prepreg and the process stability for coating. On the other hand, in cases where the volume of the liquid pool is excessively small, it is assumed that the supply of the matrix resin into the liquid pool is more likely to be insufficient with respect to the application amount. Such a case poses the possibility that the circular stream in the liquid pool will become ununiform, causing the running properties of the reinforcing fiber sheet to be poor. Heating the whole coating section causes a gap between the upper-side member 24 and the liquid surface in the liquid pool 22, and thus causes the temperature of the matrix resin 2 to be ununiform, posing the possibility that the quality stability of the resulting prepreg and the process stability for coating will be poor. Because of this, it is preferable to keep a balance among making the volume of the liquid pool small, the supply amount of the matrix resin into the liquid pool, and the application amount of the matrix resin. From this viewpoint, it is preferable to make the volume of the liquid pool small and provide a storage portion 43 for the matrix resin 2 in the vicinity of the opening 30, as with, for example, the coating section 20e depicted in FIG. 14. In addition, making the shape of this storage portion 43 vertically long makes it easy to detect the liquid surface 44 of the matrix resin 2 and also makes it easy to control the storage amount of the matrix resin 2 by controlling the liquid surface. Feeding the position of the liquid surface back to a matrix resin supply system makes it possible to keep a balance between the supply amount of the matrix resin into the liquid pool and the application amount of the matrix resin. Because of this, the storage portion 43 can be formed, for example, by the wall constituent member 21 and the upper-side member 24, but is not limited to this. From the viewpoint of minimizing the storage amount of the matrix resin, the distance B defined by the lower face of the upper-side member 24 and the upper face of the storage portion 43 in FIG. 14 is preferably 100 mm or less, and preferably 50 mm or less, also considering the degree of flexibility in designing the running pathway of the reinforcing fiber sheet 1b.

In addition, it is preferable to add a mechanism that removes fuzz from the reinforcing fiber sheet in the coating section. Furthermore, it is also preferable to add a mechanism that discharges the surplus matrix resin out.

<Application Steps of Resin Film and Release Sheet>

In the present invention, a resin film or a release sheet can further be applied to the above-mentioned primary impregnate prepreg 1c withdrawn from the application step of a matrix resin. FIG. 1 shows an example in which the resin film 4 is applied to one face and that the release sheet 3 is applied to the other face. In this example, the resin film 4 is supplied from the supply device 16b, the release sheet 3 is supplied form the supply device 16a, and the film and the sheet can be laminated onto a primary impregnate prepreg 1c on the conveyance rolls 15. FIG. 1 shows an example in which the resin film 4 and the release sheet 3, one each, are laminated, but in accordance with the purpose, only the resin film 4 or only the release sheet 3 may be laminated in one aspect, resin films may be laminated on both faces in another aspect, or release sheets may be laminated on both faces in another aspect. In another aspect, a release sheet and a resin film may be laminated on each other. The type of a resin which forms a resin film can be selected suitably in accordance with the purpose, and a mixture of a plurality of types of resins may form the resin film. In addition, in cases where two resin films are used, they may be the same kind of resin film or different kinds of resin films. In addition, in cases where two release sheets are used, they may be the same type of release sheet or different types of release sheets.

On the other hand, examples of release sheets that can be supplied include sheets formed of a polymer having releasability and sheets in which a release layer is provided on a base material, for example, sheets in which a release layer is laminated on the above-mentioned resin film. Obviously, the above description is not limited to the aspect in FIG. 1, and can equally apply to the aspects in the other drawings.

In the present invention, a resin used for the resin film is not limited to any particular one, and can suitably be selected in accordance with the purpose. A resin to be used for the resin film may be a single resin, or can be a blend of different kinds of polymers or a resin composition which is a blend of different components. The resin film to be used here can contain the above-mentioned particles. In the above-mentioned coating step, use of a matrix resin containing particles is more likely to increase the viscosity, and in some cases, decreases the coating uniformity while the reinforcing fiber sheet is running at a high speed. Because of this, providing particles in the application step of a resin film enhances the high-speed running stability of the reinforcing fiber sheet in the coating step, and thus, is preferable. In this case, the resin film containing particles can be a resin film composed of a matrix resin. This is efficient because it makes it possible to provide particles independent of the coating step and, at the same time, provide a matrix resin. In this case, the matrix resin of the matrix resin containing particles may be the same as or different from the matrix resin component used in the coating step. The components of a matrix resin used in the coating step and a matrix resin to be formed into a resin film can be adjusted taking into consideration the high-speed running stability in the coating step and the pot life of storage in the coating section.

Alternatively, a resin component can be taken out of a matrix resin, and formed into a resin film. For example, in the case of FRP, a thermoplastic resin is blended with a matrix resin composed mainly of a thermosetting resin so that the resin toughness can be enhanced, but in some cases, the thermoplastic resin increases the viscosity of the matrix resin. In such a case, this thermoplastic resin is not used as a component of the matrix resin to be provided in the above-mentioned coating step and can be applied as a resin film to a primary impregnate prepreg so that the coating stability can be enhanced. Such a thermoplastic resin to be used is often PES, PEI, PI, or the like. In some cases, such a thermoplastic resin film can also be a self-supporting film that needs no support, and is useful from the viewpoint of the possibility of omitting such a support.

A method of obtaining a resin film is not limited to any particular method, and a known method can be used. Such a film can be formed, for example, using any of various known coaters such as roll coaters, comma coaters, knife coaters, die coaters, and spray coaters. If necessary, a support such as a release sheet can be coated with a resin to form a film.

<Running Mechanism>

Known rollers or the like can suitably be used as a running mechanism for conveying a reinforcing fiber sheet and the prepreg according to the present invention. In the present invention, the reinforcing fiber sheet is conveyed horizontally or slantingly, and accordingly, the rollers are preferably disposed before and after the coating section, which is between the rollers.

In addition, it is preferable in the present invention that the running pathway of the reinforcing fiber sheet is as linear as possible in order to suppress arrangement disturbance and fuzzing of the reinforcing fibers. In addition, the prepreg is often a sheet-like integrated object that is a laminate containing a release sheet, and it is preferable that the running pathway of the sheet-like integrated object is also as linear as possible, because a bend existing in a conveying step of the object generates wrinkles due to a perimeter difference between the inner layer and the outer layer in some cases. From this viewpoint, nip rolls are more preferably used in the running pathway of the sheet-like integrated object.

Which of S-shaped arranged rolls and nip rolls should be used can suitably be determined in accordance with the production conditions and the product characteristics.

<High Tension Take-up Device>

In the present invention, it is preferable that a high tension take-up device for withdrawing the prepreg from the coating section is disposed downstream of the coating section in the process. This is because high friction force and shearing stress are generated between the reinforcing fiber sheet and the matrix resin in the coating section, and accordingly, it is preferable that high take-up tension is generated downstream in the process, in order to overcome the high friction force and the shearing stress and withdraw the prepreg. Examples of high tension take-up devices that can be used include nip rolls, S-shaped arranged rolls, belting presses, and the like. In any case of these, enhancing friction force between the device and the prepreg can prevent slipping and achieve stable running. To achieve this, it is preferable to arrange a high friction coefficient material on the surface of the device, or to increase the pressing pressure against the prepreg. From the viewpoint of preventing slipping, belting press is reliable. On the other hand, the S-shaped arranged rolls make it possible to more easily control friction force on the basis of the roll diameter and the contact length, and accordingly, are preferable.

<Release Sheet Supply Device and Winder>

A release sheet supply device and a winder can suitably be used in producing prepreg or FRP using the present invention. As such a device, any known one can be used, and in any case, it is preferable from the viewpoint of running the sheet stably that such a device includes a mechanism for making it possible to feed an unwinding or wind-up tension back to the unwinding or wind-up speed.

<Additional-Impregnation>

In order to make adjustments to a desired degree of impregnation, it is possible to further combine, with the present invention, a means for further enhancing the degree of impregnation using an impregnation device separately after coating. Here, to distinguish this means from the impregnation in the coating section, such an impregnation process additionally carried out after coating is referred to as an additional-impregnation process, and a device for an additional-impregnation process is referred to as an additional-impregnation device. A device used as an additional-impregnation device is not limited to a particular one, and can suitably be selected from known ones in accordance with the purpose. For example, as described in JP2011-132389A and WO2015/060299, impregnation can be promoted by preheating a laminate of a sheet-like carbon fiber bundle and a resin on a hot plate and sufficiently softening the resin on the sheet-like carbon fiber bundle, followed by using a device for pressing with nip rolls which are also heated. The hot plate temperature and nip roll surface temperature for preheating, the linear pressure of the nip rolls, and the diameter and number of the nip rolls can suitably be selected so as to achieve a desired degree of impregnation. Alternatively, it is also possible to use such "S-wrap rolls" as described in WO2010/150022, wherein a prepreg sheet runs in S-shape through the S-wrap rolls. In the present invention, "S-wrap rolls" are simply referred to as "S-shaped arranged rolls". FIG. 1 in WO2010/150022 describes an example in which a prepreg sheet runs in S-shape, but the contact length between the sheet and the roll may be adjusted in U-shape, V-shape, or A-shape as long as impregnation can be carried out. In addition, opposing contact rolls can be added in cases where the impregnation pressure is increased to enhance the degree of impregnation. Furthermore, as described in FIG. 4 in WO2015/076981, it is also possible to attempt to increase the production speed of prepreg by arranging a conveyor belt opposite to "S-wrap rolls" and thereby enhancing impregnation efficiency. Alternatively, as described in WO2017/068159, JP2016-203397A, and the like, it is also possible to enhance impregnation efficiency by subjecting prepreg to ultrasonication to heat the prepreg rapidly before impregnation. Alternatively, as described in JP2017-154330A, it is also possible to use an impregnation device in which a plurality of "squeeze blades" are vibrated by an ultrasonic generator. Alternatively, as described in JP2013-22868A, it is also possible to fold a prepreg up and carry out impregnation.

<Simplified Additional-Impregnation>

The above description shows an example in which a conventional additional-impregnation device is applied, but, in some cases, the temperature of the primary impregnate prepreg is still high immediately after the coating section, and in such cases, it is also possible to simplify and make smaller an impregnation device significantly by adding an additional-impregnation operation at a stage where time has not yet elapsed very much after the prepreg exits from the coating section, thereby omitting or simplifying a heating device such as a hot plate for heating the primary impregnate prepreg again. An impregnation device positioned immediately after the coating section is referred to as a simplified additional-impregnation device. As a simplified additional-impregnation device, heated nip rolls and heated S-shaped arranged rolls can be used. Compared with a usual impregnation device, they make it possible not only to decrease the roll diameter, the set pressure, and the contact length between the primary impregnate prepreg and the rolls, thereby enabling the device to be smaller, but also to decrease the power consumption, and accordingly, are preferable.

In addition, applying a release sheet to the primary impregnate prepreg before the primary impregnate prepreg enters the simplified additional-impregnation device enhances the running properties of the primary impregnate prepreg, and accordingly, is preferable.

Figure 17:
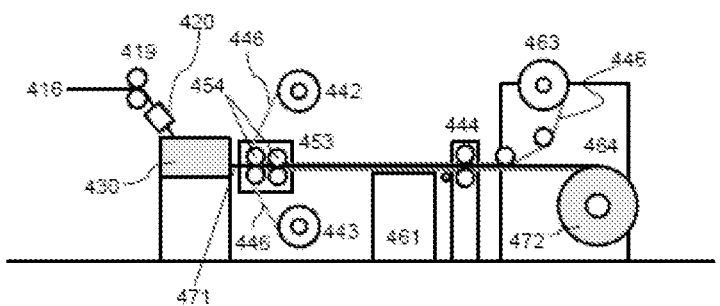
FIG. 17 is a schematic diagram of an example of another process/apparatus for producing a prepreg using the present invention.

FIG. 17 shows an example of a prepreg production process including a simplified additional-impregnation device. A simplified additional-impregnation device 453 is arranged immediately after a coating section 430. Here, nip rolls are shown as an example of the simplified additional-impregnation device 453, and the nip roller preferably includes a heating mechanism. In addition, the number of stages of the nip rolls can be suitably selected depending on the purpose, and is preferably three or less from the viewpoint of process simplification (FIG. 17 shows an example of two stages). In addition, the nip roller preferably includes a driving device from the viewpoint of easy tension control for conveyance of a prepreg. The nip pressure can be suitably adjusted in accordance with a desired degree of impregnation.

In order that the primary impregnate prepreg cannot stick to the surface of the nip roll, it is preferable that the surface preliminarily undergoes a suitable release treatment, or that a release sheet is inserted between the primary impregnate prepreg and the nip roll. In cases where a release sheet is inserted between the primary impregnate prepreg and the nip roll, it is also possible that the sheet is inserted from the coating section 430 side, and that the release sheet is detached from the primary impregnate prepreg at the rolls on the high tension take-up device 444 side. The detached release sheet may be directly wound up, or may circuit so as to be inserted from the coating section 430 side again.

In addition, examples of additional-impregnation devices that can be used include not only nip rolls but also the above-mentioned "S-wrap roll", a fixing bar, and the like.

<Prepreg>

A prepreg mentioned in the present invention refers to a reinforcing fiber sheet having a matrix resin applied thereto, and is a two-dimensional sheet-like intermediate base material to be used to produce FRP. To the extent which does not depart from this meaning, what is called a pultruded (pultrusion) material is also included in examples of the prepreg in the present invention. As below-mentioned, the prepreg is not limited to any particular width, and may be produced in the form of a tape having a narrow width or produced to have a broad width of up to approximately 2 m. In addition, the prepreg is not limited to any particular thickness, and generally has a thickness of approximately 0.05 mm to 1 mm.

In a prepreg obtained by a production method according to the present invention, the impregnation ratio of a matrix resin is desirably 10% or more. As to the state of impregnation with the matrix resin, a sampled prepreg can be torn off so that the inside of the prepreg can be visually checked to see how the prepreg has been impregnated. More quantitatively, the impregnation ratio can be evaluated, for example, by a peeling method. Measuring the impregnation ratio of the matrix resin by a peeling method can be carried out in the following manner. That is, a sampled prepreg is sandwiched between adhesive tapes, these are peeled off, and the reinforcing fiber to which the matrix resin has stuck and the reinforcing fiber to which the matrix resin has not stuck are separated. Then, the ratio of the mass of the reinforcing fiber to which the matrix resin has adhered with respect to the mass of the whole reinforcing fiber sheet that has been used can be regarded as an impregnation ratio of the matrix resin based on a peeling method. In cases where the prepreg has a high degree of impregnation, the degree of impregnation can also be evaluated using a water absorption rate based on the capillarity phenomena of the prepreg. Specifically, a method described in Japanese Translation of PCT International Application Publication No. JP-T-2016-510077 can be used, wherein one side of a prepreg cut to 10 cm x10 cm is immersed by 5 mm in water for five minutes, causing a change in the mass, from which change the impregnation ratio can be calculated.

<Prepreg Width>

The width of a prepreg is not limited to a particular one, and the width may be broad, tens of centimeters to approximately two meters, or may be tape-like, several millimeters to tens of millimeters. The width can be selected in accordance with the application. In recent years, a device called ATL (Automated Tape Laying) or AFP (Automated Fiber Placement) in which narrow prepregs or prepreg tapes are automatically laminated has widely been used to make a prepreg laminating step more efficient, and the width is also preferably adapted to such a device. ATL often involves use of narrow prepregs having a width of approximately 7.5 cm, approximately 15 cm, and approximately 30 cm, and AFP often involves use of prepreg tapes having a width of approximately 3 mm to approximately 25 mm.

A method of obtaining a prepreg having a desired width is not limited to a particular one, and a method in which a broad prepreg having a width of approximately 1 m to approximately 2 m is slit into narrow prepregs can be used. Alternatively, in order to simplify or omit the slitting step, the width of the coating section used in the present invention can be adjusted so as to be a desired width from the beginning. For example, in cases where a narrow prepreg having a width of 30 cm is produced for ATL, the width of the outlet of the coating section can be adjusted in accordance with the former width. Further in order to produce this prepreg efficiently, it is preferable to produce a product having a width of 30 cm, and juxtaposing a plurality of such production apparatuses enables prepregs to be produced in a plurality of lines using the same running devices, conveyance devices, various rolls, and winders.

Figure 18:
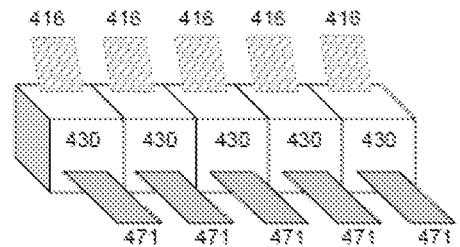
FIG. 18 is a diagram depicting an example of an aspect in which a plurality of coating sections are included, wherein the aspect is according to one embodiment of the present invention.

FIG. 18 shows an example in which five coating sections are linked in parallel. Here, five reinforcing fiber sheets 416 may pass through the respective independent five coating sections 430 to yield five primary impregnate prepregs 471, or the coating sections 430 may be integrated in parallel. In this case, the coating sections 430 have only to include five independent width regulation mechanisms and five independent coating section outlet widths.

In addition, prepreg tapes can be obtained by forming a reinforcing fiber sheet from approximately one yarn to four yarns of tape-like reinforcing fiber bundles and allowing the resulting reinforcing fiber sheet to pass through the coating section the width of which is adjusted to afford a desired tape width. For prepreg tapes, particularly the accuracy of the tape width is often required, from the viewpoint of controlling cross-directional overlapping between the tapes. Because of this, it is preferable to control the coating section outlet width more strictly, and in this case, it is preferable that the above-mentioned L, L2, and W satisfy the relationship(s) of $L \leq W+1$ mm and/or $L2 \leq W+1$ mm.

<Slit>

The method of slitting prepreg is not limited to a particular one, and a known slitting device can be used. A prepreg may be slit after the prepreg is once wound up and separately mounted in a slitting device, or, to obtain efficiency, a slitting step may be disposed continuously after a prepreg production step without once winding up the prepreg. In addition, the slitting step may be a step in which a 1 m or more broad prepreg is directly slit into prepregs having a desired width, or once cut and split into approximately 30 cm narrow prepregs and then slit again into prepregs having a desired width.

Here, in cases where the above-mentioned plurality of coating sections for narrow prepregs or prepreg tapes are juxtaposed, the respective independent release sheets may be supplied, or a plurality of prepreg sheets may be laminated on one broad release sheet that has been supplied. The width direction edges of the prepreg thus obtained can be cut off and supplied into an ATL or AFP device. In this case, the major part of the edges to be cut off is from the release sheet, and accordingly, the amount of the matrix resin component (the resin component in the case of FRP) sticking to the slit cutter blade can be decreased, resulting in being also advantageous in that the cleaning cycle for the slit cutter blade can be extended.

<Variation and Application of the Present Invention>

In the present invention, a plurality of coating sections can be used to attempt to make the production process more efficient and more highly capable.

Figure 19:
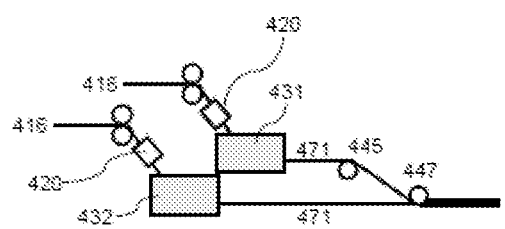
FIG. 19 is a diagram depicting an example of an aspect in which a plurality of prepregs are laminated, wherein the aspect is according to one embodiment of the present invention.

For example, a plurality of coating sections can be arranged so that a plurality of prepregs can be laminated. FIG. 19 shows an example of an aspect in which prepregs are laminated using two coating sections. Two primary impregnate prepregs 471 withdrawn from a first coating section 431 and a second coating section 432 pass by a diverting roll 445, and laminated at a lamination roll 447 downstream of the diverting roll. When this is done, positioning a release sheet between the primary impregnate prepreg 471 and the diverting roll can suppress the adhesion of the prepreg to the roll and stabilize the running, and thus, is preferable. In this regard, the diverting roll can be replaced with a diverting guide provided with release treatment, or replaced with the like.

Such a lamination type of prepreg makes it possible to attempt to make the prepreg lamination step efficient, and is effective, for example, in production of a thick type of FRP. In addition, laying up prepregs of a thin type into a multilayer laminate makes it possible to expect that the FRP toughness and the impact resistance are enhanced, and applying the present production method enables a thin type of multilayer laminated prepreg to be obtained efficiently. Furthermore, laminating different kinds of prepregs easily enables a hetero-bound prepreg having functionality imparted thereto to be obtained easily. In this case, it is possible to change the kind and fineness of the reinforcing fiber, the number of filaments, the mechanical property, the fiber surface property, and the like. In addition, the matrix resin (a resin in the case of prepreg) used can also be a different one. For example, a hetero-bound prepreg in which different prepregs having different thicknesses or different prepregs having different mechanical properties are laminated can be obtained. In addition, a prepreg that can achieve both mechanical properties and tackiness properties can be obtained easily by applying a resin having excellent mechanical properties in the first coating section, applying a resin having excellent tackiness properties in the second coating section, and laminating these. Conversely, a resin having no tackiness properties can also be disposed on the surface. It is also possible to apply a particle-free resin in the first coating section and apply a particle-containing resin in the second coating section.

In another aspect, a plurality of coating sections can be juxtaposed with respect to the running direction of the reinforcing fiber sheet, that is, a plurality of coating sections can be juxtaposed in the width direction of the reinforcing fiber sheet, as illustrated in FIG. 18 and described above. This enables narrow or tape-like types of prepregs to be produced efficiently. In addition, using different reinforcing fibers and different matrix resins for different coating sections makes it possible to obtain a prepreg having properties varying in the width direction.

In another aspect, a plurality of coating sections can also be disposed in series in the running direction of the reinforcing fiber sheet. Such a serial type of disposition enables the kinds of matrix resins to be varied in the thickness direction of the primary impregnate prepreg. In addition, even using the same kind of matrix resin enables the running stability and the high-speed running properties to be enhanced by allowing the coating conditions to vary depending on the coating section. For example, a prepreg that can achieve both mechanical properties and tackiness properties can be obtained easily by applying a resin having excellent mechanical properties in the first coating section, applying a resin having excellent tackiness properties in the second coating section, and laminating these. Conversely, a resin having no tackiness properties can also be disposed on the surface. It is also possible to apply a particle-free resin in the first coating section and apply a particle-containing resin in the second coating section.

As above-mentioned, some aspects in which a plurality of coating sections are disposed have been shown, the number of coating sections is not limited to a particular one, and the aspects can be applied in various manners in accordance with the purpose. Needless to say, these types of dispositions can also be combined. Furthermore, the various sizes, shapes, and coating conditions (temperature and the like) of the coating section can be used in mixture.

As described above, the production method according to the present invention not only enables the production to be efficient and stable but also enables the product to be made high-performance and capable, and has excellent extendability.

<Matrix Resin Supply Mechanism>

In the present invention, the matrix resin is stored in the coating section, but it is preferable to replenish the matrix resin suitably because the coating progresses. The mechanism for supplying the coating section with a matrix resin is not limited to a particular one, and a known device can be used. Supplying the coating section with a matrix resin continuously makes it possible not to disturb the liquid surface at the top of the coating section and to stabilize the running of the reinforcing fiber sheet, and accordingly, is preferable. For example, the matrix resin can be supplied by its own weight as a driving force from a vessel storing the matrix resin, or supplied continuously using a pump or the like. As a pump, a gear-pump, tube pump, pressure pump, and the like can suitably be used in accordance with the properties of the matrix resin. In addition, in cases where the matrix resin is solid at room temperature, a melter is preferably provided at the upper portion of the storage vessel. In addition, a continuous extruder and the like can be used. As to the supply amount of the matrix resin, a mechanism for enabling the matrix resin to be supplied continuously in accordance with the coating amount is preferably provided so that the liquid level of the matrix resin in the upper portion in the coating section can be as constant as possible. For this, for example, a mechanism in which the liquid level and the coating section weight are monitored and fed back to a supply device is conceivable, as above-mentioned.

<On-Line Monitoring>

In addition, a mechanism for allowing the coating amount to be monitored on-line is preferably provided in order to monitor the coating amount. The on-line monitoring method is not limited to a particular one, and a known one can be used. For example, as a device for thickness measurement, for example, a β-ray gauge can be used. In this case, the coating amount can be estimated by measuring the thickness of a reinforcing fiber sheet and the thickness of a prepreg and analyzing the difference between the thicknesses. The coating amount monitored on-line can immediately be fed back to the coating section, and utilized to adjust the temperature of the coating section and the gap D in the narrowed section 23 (see FIG. 1). Needless to say, the coating amount monitoring can be used as defect monitoring. As to the thickness measurement position, for example, in FIG. 15, the thickness of the reinforcing fiber sheet 416 can be measured before the sheet is introduced into the coating section 430, and the thickness of the prepreg can be measured between the coating section 430 and the high tension take-up device 444. In addition, on-line defect monitoring is preferably carried out using infrared, near-infrared, camera (image analysis), and the like.

The coating device according to the present invention has a running mechanism and a coating mechanism, wherein the running mechanism allows a reinforcing fiber sheet, which is unidirectionally arranged reinforcing fibers, to run vertically downward, and wherein the coating mechanism is capable of storing the matrix resin in the inside thereof, and further includes a liquid pool and a narrowed section which are in communication with each other, wherein the liquid pool has a portion whose cross-sectional area decreases continuously along the running direction of the reinforcing fiber sheet, and wherein the narrowed section has a slit-like cross-section and has a smaller cross-sectional area than the top side of the liquid pool.

Below, the present invention will be described in detail with reference to a specific example in which a prepreg is produced using the coating device. In this regard, the following description is an example, and the present invention is not construed to be limited to the aspect described below.

Figure 15:
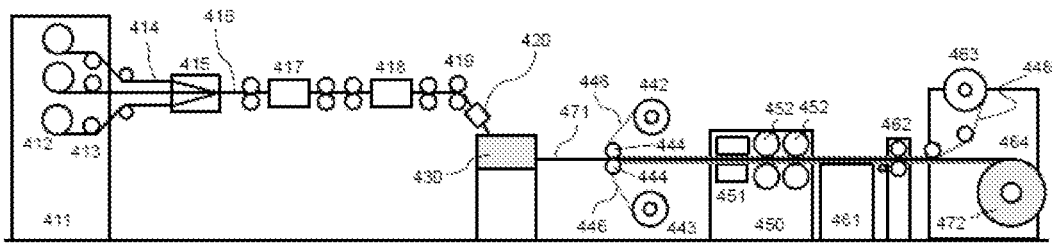
FIG. 15 is a schematic diagram depicting an example of a process/apparatus for producing a prepreg using the present invention.

FIG. 15 is a schematic diagram of an example of a process/device of producing a prepreg using the present invention. A plurality of reinforcing fiber bobbins 412 are fit onto creels 411, and the reinforcing fibers pass by the diverting guides 413 and withdrawn. Here, a braking mechanism provided in the creel enables the reinforcing fiber 414 to be withdrawn at a constant tension. A plurality of the reinforcing fibers 414 that have been withdrawn are orderly arranged by a reinforcing fiber arrangement device 415 to form a reinforcing fiber sheet 416. Here, FIG. 15 depicts only three yarns of reinforcing fiber, but in reality, one yarn to hundreds of yarns are possible, and adjustments can be made to afford a desired prepreg width and fiber areal weight. Then, the reinforcing fiber sheet passes through a fiber bundle widening device 417 and a smoothing device 418, passes through conveyance rolls 419, and is introduced into a reinforcing fiber sheet preheating device 420 and the coating section 430. The reinforcing fiber sheet preheating device 420 can be used to match the temperature of the matrix resin in the coating section to the temperature of the reinforcing fiber sheet as closely as possible, and can be omitted. In FIG. 15, the reinforcing fiber sheet 416 is linearly conveyed between the devices from the reinforcing fiber arrangement device 415 to the conveyance rolls 419. In this regard, the fiber bundle widening device 417 and the smoothing device 418 can be skipped suitably, or omitted depending on the purpose. In addition, the arrangement order of the reinforcing fiber arrangement device 415, the fiber bundle widening device 417, and smoothing device 418 can suitably be changed in accordance with the purpose. The reinforcing fiber sheet 416 runs slantingly downward from the conveyance rolls 419, passes through the coating section 430, and reaches the high tension take-up device 444. For the coating section 430, an arbitrary shape of the coating section can be adopted to the extent that the object of the present invention can be achieved. Examples include such shapes as in FIG. 9 to FIG. 12, FIG. 14, FIG. 27, FIG. 29, and FIG. 32. In addition, a width regulation mechanism can be provided as in FIG. 8, if necessary. In FIG. 15, release sheets or resin films 446 unwound from supply devices 442 and 443 can be laminated onto the primary impregnate prepreg 471 on the high tension take-up device 444. Here, the resin film or the release sheet may be used singly, or a laminate of the resin film and the release sheet may be used. In this case, the face of the resin film is preferably adhered tightly to the surface of the prepreg. A release paper sheet, a release film, or the like can be used as a release sheet. FIG. 15 depicts nip rolls as the high tension take-up device 444. Then, the sheet-like integrated object passes through an additional-impregnation device 450 including hot plates 451 and heated nip rolls 452, is cooled in a cooling device 461, is taken up by a take-up device 462, followed by peeling off the release sheet 446, and then, is wound up in a winder 464, whereby a sheet-like integrated object 472 composed of prepreg and a release sheet can be obtained as a product. The sheet-like integrated object is conveyed basically linearly from the high tension take-up device 444 to the winder 464, and accordingly, generation of wrinkles can be suppressed. Here, the depiction of a matrix resin supply device and an on-line monitoring device is omitted in FIG. 15.

Figure 16:
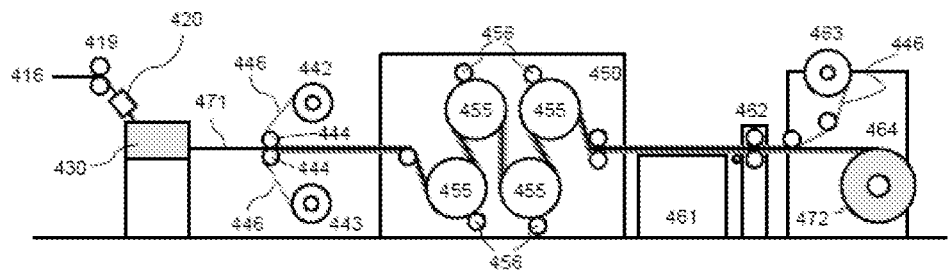
FIG. 16 is a schematic diagram of an example of another process/apparatus for producing a prepreg using the present invention.

FIG. 16 is a schematic diagram of another example of a process/device for producing a prepreg using the present invention. FIG. 16 depicts an example in which two sets of two heated S-shaped arranged rolls 455 (four rolls in total) of an "S-wrap roll" type are used as an additional-impregnation device, but the number of rolls may be larger or smaller in accordance with the purpose. In addition, FIG. 16 depicts contact rolls 456 for enhancing the impregnation effect, but the contact rolls can be omitted depending on the purpose.

FIG. 17 is a schematic diagram of another example of a process/device for producing a prepreg using the present invention. Shown here is an example in which a simplified additional-impregnation device is used. In FIG. 17, a simplified additional-impregnation device 453 is installed immediately after the coating section 430, and accordingly, the prepreg 471 in a high-temperature state is introduced into the simplified additional-impregnation device 453, so that the impregnation device can be simplified and made smaller. In FIG. 17, heated nip rolls 454 are depicted as an example, but needless to say, smaller heated S-shaped arranged rolls may be used depending on the purpose. Use of a simplified additional-impregnation device also has an advantage in that the whole prepreg production device can be made very compact. In particular, in cases where the resin film 446 is a particle-containing resin film, increasing the degree of impregnation of the primary impregnate prepreg makes it possible to allow the particles in the resin film to be arranged in the surface layer of the prepreg in the subsequent step, and thus, is preferable.

Below, an embodiment of the present invention will be described with reference to an example in which the effect of the portion whose cross-sectional area decreases intermittently in the liquid pool was verified by simulation.

Figure 20:
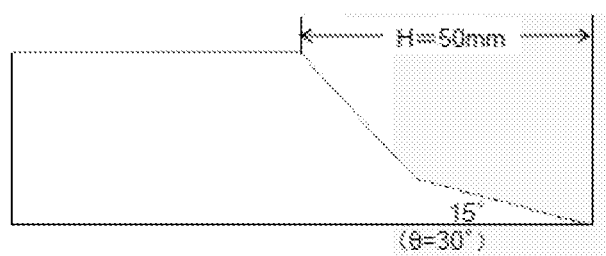
FIG. 20 is a diagram showing the simulation result (liquid pressure) obtained with H=50.
Figure 20:
Figure 20:
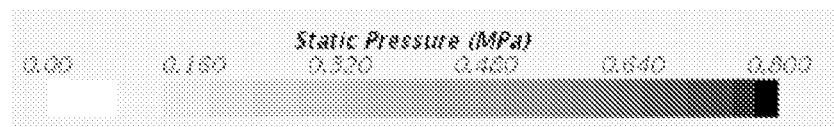
Figure 21:
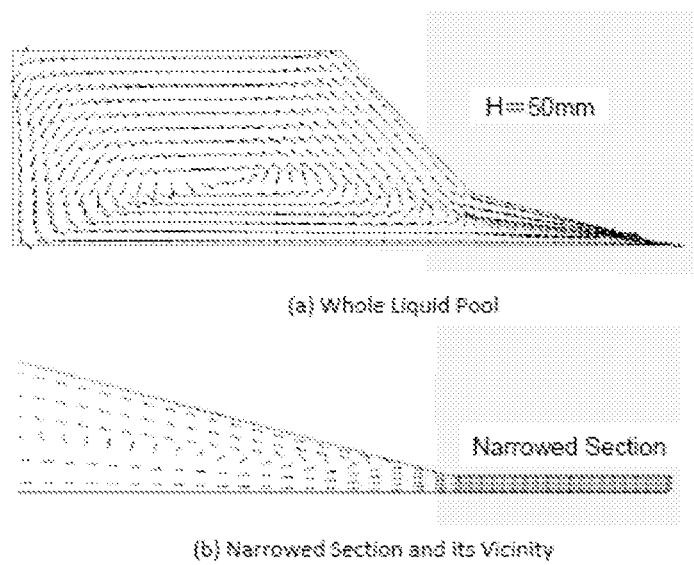
FIG. 21 is a diagram showing the simulation result (liquid flow) obtained with H=50.

In carrying out the simulation, a software STAR-CCM+ manufactured by Siemens AG was used, and the Navier-Stokes equation was solved for numerical analysis of the liquid flow and liquid pressure in the portion whose cross-sectional area decreases intermittently. More specifically, the portion whose cross-sectional area decreases intermittently was modeled as a fluid portion, and the premise was made that the fluid portion is a two-dimensional flow, i.e., that the fluid (matrix resin) flows only on the X-Z plane and does not flow in the direction Y. In this case, the viscosity of the fluid was 10 Pa·s, the density was 1000 kg/m$^3$, and the running speed of the reinforcing fiber sheet was set to 20 m/minute. The analysis results obtained with $\theta=30°$ and H=50 mm are shown in FIG. 20 and FIG. 21. In this regard, the analysis was premised with a plane symmetry with respect to the reinforcing fiber sheet, and thus, only the upper half is shown in the drawings.

Figure 22:
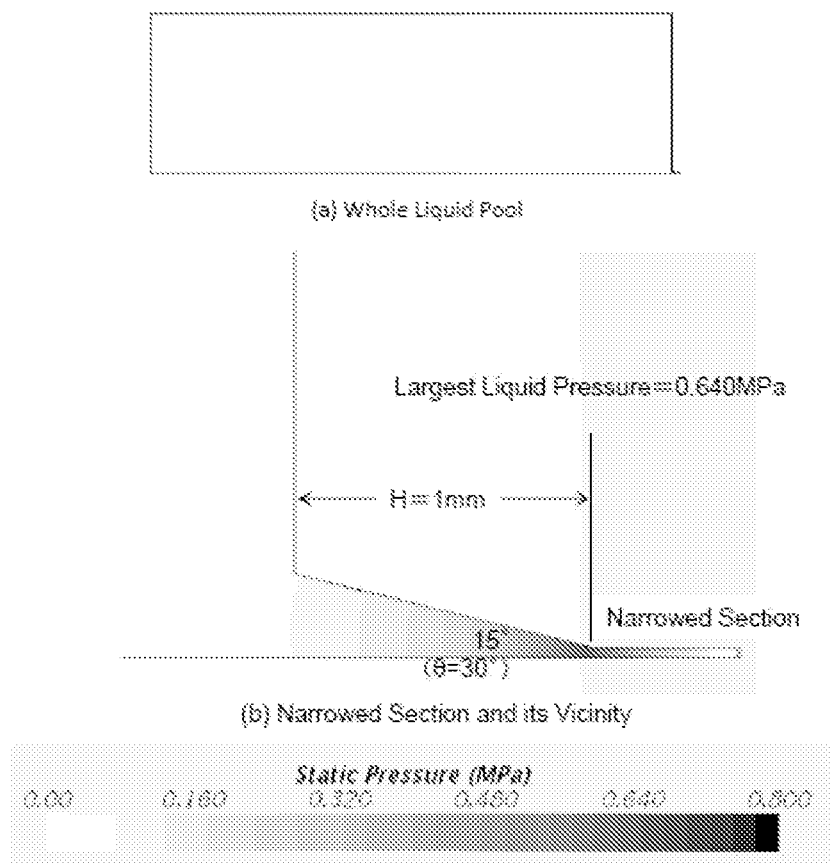
FIG. 22 is a diagram showing the simulation result (liquid pressure) obtained with H=1.
Figure 23:
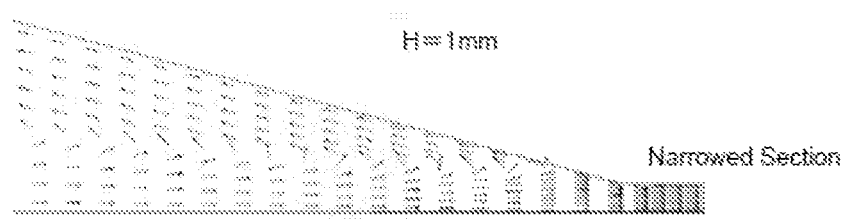
FIG. 23 is a diagram showing the simulation result (liquid flow) obtained with H=50.

As shown in FIG. 20, it is revealed that the liquid pressure increases in the direction toward the outlet of the portion whose cross-sectional area decreases intermittently in the liquid pool, and that the largest liquid pressure is 0.782 MPa, which is high. In addition, as shown in FIG. 21, it is revealed that the accompanying flow on the reinforcing fiber sheet is turned back at the high-pressure liquid portion to form a circular stream. In addition, FIGS. 22 and 23 show an example in which the taper length (i.e., H) was 1 mm, and the calculation result revealed that the largest liquid pressure was 0.640 MPa, which was lower than with H=50 mm, but that the liquid pressure was still high (FIG. 22). FIG. 23 shows the state where, in this way, a flow in the direction opposite to the running direction of the reinforcing fiber sheet was formed in the vicinity of the narrowed section.

Figure 24:
FIG. 24 is a diagram showing the simulation result (liquid pressure) obtained with H=0.
Figure 24:
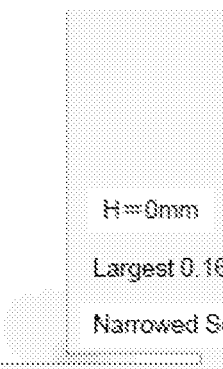
Figure 24:
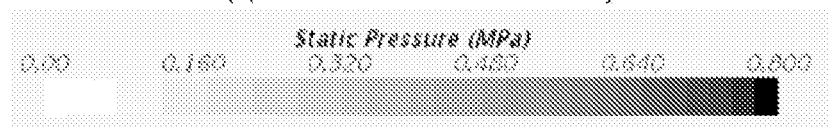
Figure 25:
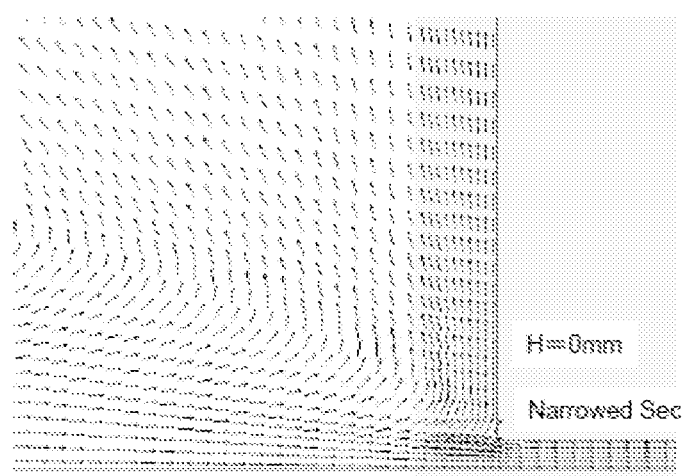
FIG. 25 is a diagram showing the simulation result (liquid flow) obtained with H=0.

On the other hand, FIGS. 24 and 25 show the calculation result obtained from a case in which H=0 mm, i.e. the liquid pool had no portion whose cross-sectional area decreases intermittently. This has revealed the calculation result that the largest liquid pressure was 0.166 MPa, which was quite lower (approximately ¼) than with H=1 mm. In combination with the facts that the liquid pressure was low and that no tapered portion was in the vicinity of the narrowed section, the results suggest that the flow in the direction along the outlet side member was large in the vicinity of the narrowed section, and that the formation of a flow in the direction opposite to the running direction of the reinforcing fiber sheet was weak (FIG. 25).

Figure 26:
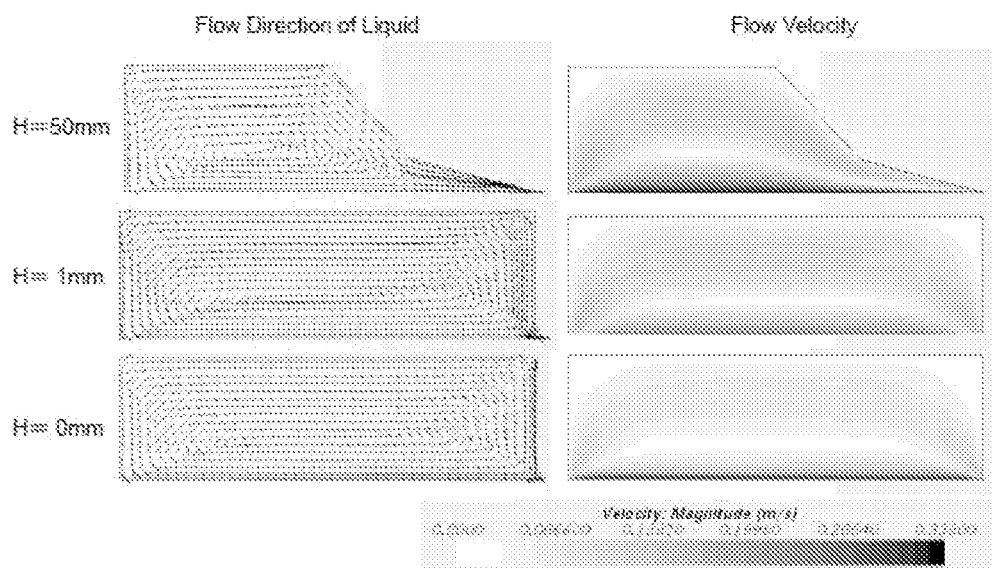
FIG. 26 is a diagram showing the simulation results (liquid flow and flow velocity) obtained with H changed.

In comparison, FIG. 26 shows that the flow velocity with H changed was shaded according to the grayscale in order to consider, in detail, the formation of a circular stream with respect to the taper length H. The diagram of the flow velocity shows that a darker shade means a higher flow velocity. First, referring to the diagrams showing the flow direction of the liquid, a circular stream appears to have been formed with H=0, but referring to the diagrams of the flow velocity, it is understood that, with H=0 mm, the liquid flowed once away from the narrowed section, and then, flowed in the direction opposite to the running direction of the reinforcing fiber sheet, and that the flow velocity is lower (more lightly shaded in the diagram) than with H=1 mm. This derives the thought that the formation of a circular stream is quite weak with H=0 mm, making it impossible to obtain the effects of the present invention. Next, with H=50 mm, the flow velocity of the flow in the direction opposite to the running direction of the reinforcing fiber sheet is larger (more shaded) than with H=1 mm obviously in the vicinity of the narrowed section and also apart therefrom, showing that the formation of a circular stream is strong, allowing the effects of the present invention to be highly achieved. Furthermore, with H=0 mm and H=1 mm, the liquid flow is extremely smaller toward the corner in the direction away from the narrowed section (the upper right corner in the drawing), revealing that a stagnant portion is formed. Such a stagnant portion, if any, makes it more likely to deteriorate the matrix resin, which is liquid. This portion is cured particularly in cases where a thermosetting resin is used as the matrix resin. The cured object is carried in the liquid, and in some cases, acts as foreign matter which disturbs the processes and decreases the quality of the resulting prepreg. It is understood, however, that such a stagnant liquid portion is more unlikely to be generated in cases where the portion whose cross-sectional area decreases intermittently is long as with H=50 mm, which is thus advantageous for the process stabilization and the enhancement of the quality of the prepreg.

The above-mentioned has shown the effect of having a portion whose cross-sectional area decreases intermittently and the fact that a larger value of H causes a higher liquid pressure as well as a larger circular stream, and has revealed that a larger value of H enables the effect of the present invention to be higher.

Below, illustrations in which a prepreg is obtained by a method of producing a prepreg according to the present invention will be described. However, the present invention is not construed to be limited to such illustrations.

<Illustration 1: Thermosetting Broad Prepreg (1)>

Figure 27:
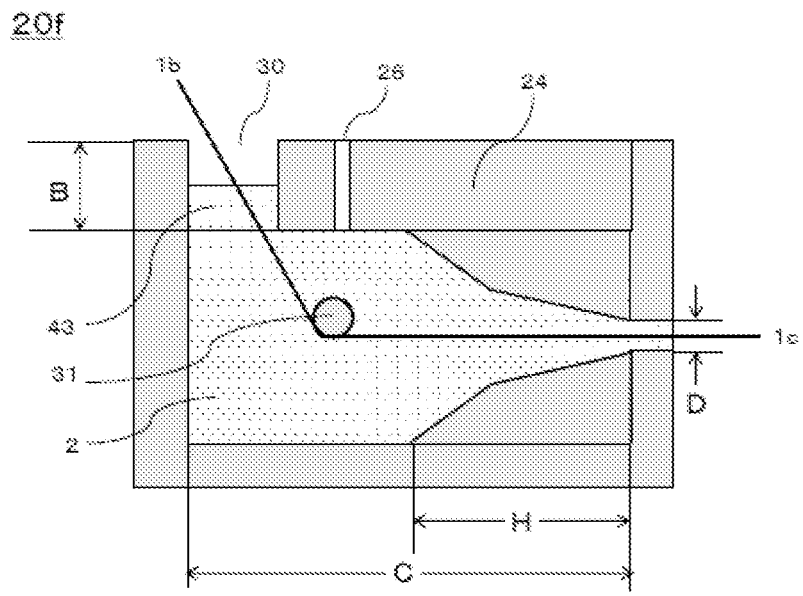
FIG. 27 is a detailed cross-sectional view of the coating section 20f according to an embodiment other than in FIG. 9.

The coating section type 20f in the form depicted in FIG. 27 can be used as a coating section, and an apparatus obtained by removing a fiber bundle widening device, a smoothing device, and an additional-impregnation device from an apparatus configured as described in FIG. 15 (the depiction of a resin supply section is omitted) can be used as a prepreg production apparatus.

The side wall member of the coating section is formed from an acrylic resin plate so that the state of the inside can be observed. In addition, the running direction of the reinforcing fiber sheet in the liquid pool is the horizontal direction, the liquid pool is tapered in two tiers. The opening angle of the first-tier taper can be 15 to 20°, and the taper can have a length (i.e., H) of 10 to 70 mm, and the opening angle of the second-tier taper can be 5 to 10°. In addition, a plate-like bush conformed to the internal shape of the coating section is provided as a width regulation mechanism, as described in FIG. 8, and furthermore, the installation position of the plate-like bush is made freely variable so that L2 can suitably be adjusted. The width U of the narrowed section can be adapted to become 300 mm in cases where L2 is 300 mm. The gap D in the narrowed section is approximately 0.18 mm, and can be adjusted in accordance with a desired areal weight. In this case, the aspect ratio of the outlet slit was 1500. In addition, the space external to each bush can be closed off at the outlet side of the narrowed section so that the matrix resin cannot leak through the outlet of the narrowed section. In addition, the distance B defined by the upper side of the liquid pool and the upper side of the storage portion can be 50 to 70 mm. In addition, the length C of the liquid pool can be shortened in a range which enables the reinforcing fiber sheet to run, and specifically, the length can be 100 to 200 mm.

Carbon fiber ("TORAYCA (registered trademark)" T800S (24K), manufactured by Toray Industries, Inc.) or the like can be used as a reinforcing fiber, and the below-mentioned thermosetting epoxy resin composition can be used as a matrix resin. In addition, the number of reinforcing fiber bobbins can be changed in accordance with the areal weight of a prepreg to be produced, and using 56 yarns makes it possible to obtain a prepreg having a common areal weight.

A prepreg can be produced using a bisphenol type epoxy resin ("jER (registered trademark)" 825, manufactured by Mitsubishi Chemical Corporation) as a matrix resin at room temperature (with the resin viscosity corresponding to 4 to 7 Pa·s) with the running speed of the reinforcing fiber sheet and the prepreg set to 5 to 25 m/minute.

As in the present illustration, using a coating section made of a transparent material such as acryl enables the inside of the coating section to be observed, thus making it possible to evaluate the running properties of the reinforcing fiber sheet. More specifically, the continuous running properties can be evaluated as below-mentioned. That is, the reinforcing fiber sheet is run continuously for 30 minutes. One which causes no fuzz clogging nor yarn breaking is rated as "Good", and one which causes fuzz clogging and yarn breaking is rated as "Bad". In addition, to evaluate a sign of fuzz clogging, the coating section is dismantled after each of the 60-minute and the 120-minute continuous running, the liquid contact surface of the upper-side member is checked by visual observation for fuzz. The fuzz prevention properties by virtue of which fuzz stuck to or to the vicinity of the narrowed section after the continuous running are rated as "Poor"; the fuzz prevention properties by virtue of which fuzz stuck to the portion far from the narrowed section (on or near the boundary between the portion whose cross-sectional area does not decrease and the portion whose cross-sectional area decreases continuously) after the continuous running are rated as "Fair"; the fuzz prevention properties by virtue of which no fuzz stuck to the liquid contact surface of the upper-side member after the continuous running are rated "Good". In addition, the reinforcing fiber sheet is run continuously at a running speed of 20 m/minute for 60 minutes, and a measurement is made of the time during which the reinforcing fiber sheet is run uniformly without having any split of the reinforcing fiber bundle (parts at which the sheet-like reinforcing fiber bundle is torn in streaks) or any edge folding of the reinforcing fiber bundle (parts at which the reinforcing fiber bundle is folded over) on the boundary between the portion whose cross-sectional area does not decrease and the portion whose cross-sectional area decreases continuously. The reinforcing fiber sheet that is run uniformly without any split of the fiber bundle or any edge folding of the fiber bundle during the time the ratio of which is 90% or more of the whole running time is rated as "Excellent", 50% or more and less than 90% "Good", 10% or more and less than 50% "Fair", less than 10% "Poor".

In the present illustration, setting the running speed of the reinforcing fiber sheet to approximately 20 m/minute, which is a high speed, still makes it possible that fuzz/yarn clogging does not occur (Good) with H≥30 mm, and also that the fuzz prevention properties are Good. In addition, setting the relationship L2−W between the width L2 of the lower end of the width regulation mechanism and the width W of the primary impregnate prepreg to 0≤L2−W≤W+2 (mm) makes it possible that the splitting of the reinforcing fiber bundle is Excellent, and that the edge folding of the reinforcing fiber bundle is Excellent.

In addition, suitably adjusting the taper shape and the gap D in the narrowed section makes it possible that the impregnation ratio based on a peeling method is 50% or more. The impregnation ratio based on a peeling method can be calculated from the ratio of the mass of the reinforcing fiber to which a matrix resin has stuck with respect to the mass of the whole reinforcing fiber sheet that has been used, in which a sampled prepreg is sandwiched between adhesive tapes, these are peeled off, and the reinforcing fiber to which the matrix resin has stuck and the reinforcing fiber to which the matrix resin has not stuck are separated.

In addition, the areal weight of a 100 mm square in the width direction of the thus obtained primary impregnate prepreg can be brought within the range of ±2 mass % for both a carbon fiber and a resin, making it possible to obtain an excellent areal weight uniformity in the width direction. In this regard, the uniformity of the areal weight of the prepreg in the width direction can be evaluated as below-mentioned. A 300 mm wide prepreg is cut into a right edge, a center portion, and a left edge in the width direction, 100 mm square each, and the mass of the prepreg and the mass of the carbon fiber are each measured with n=3. The mass of the carbon fiber is measured as a residue obtained by eluting the resin from the prepreg with a solvent. From these, the average values for the sampling positions are calculated, and the average values for the sampling position are compared.

<Illustration 2: Thermosetting Broad Prepreg (2)>

The coating section can be made of stainless steel. Furthermore, to heat the matrix resin, a plate-heater can be attached to the periphery of the coating section, and the temperature and viscosity of the matrix resin can be adjusted while the temperature is measured with a thermocouple. In other respects, the same coating section, prepreg production apparatus, and reinforcing fiber sheet as in the above-mentioned illustration 1 can be used.

Next, a matrix resin A that is a thermosetting epoxy resin composition can be used as a matrix resin. This is a mixture of an epoxy resin (a mixture of an aromatic amine type of epoxy resin and a bisphenol type of epoxy resin), a hardener (diaminodiphenyl sulfone), and polyethersulfone, and contains no polymer particles. The viscosity of this matrix resin A can be measured using the ARES-G2 manufactured by TA Instruments, Inc., and is 50 Pa·s at 75° C., 15 Pa·s at 90° C., and 4 Pa·s at 105° C., at a measurement frequency of 0.5 Hz at a temperature ramp rate of 1.5° C./minute. Using this matrix resin A, a prepreg can be produced with the matrix resin temperature set to 75 to 105° C. in the coating section and with the running speed of the reinforcing fiber sheet and the prepreg set to 5 to 25 m/minute.

For example, a prepreg can be produced with a coating section having a first-tier taper at an opening angle of 17° and a second-tier taper at an opening angle of 7°, with H=70 mm and L2−W=0 mm, with the matrix resin temperature set to 90° C. in the coating section, and with the running speed of the reinforcing fiber sheet and the prepreg set to 20 m/minute. Evaluating the high-speed running properties of the resulting prepreg can bring the results that no fuzz/yarn clogging occurs and that the fuzz prevention properties are Good. In addition, it is made possible that the degree of impregnation based on a peeling method is 50% or more, and that the areal weight uniformity in the width direction is brought within the range of ±2%.

<Illustration 3: Thermosetting Broad Prepreg (3)>

Figure 28:
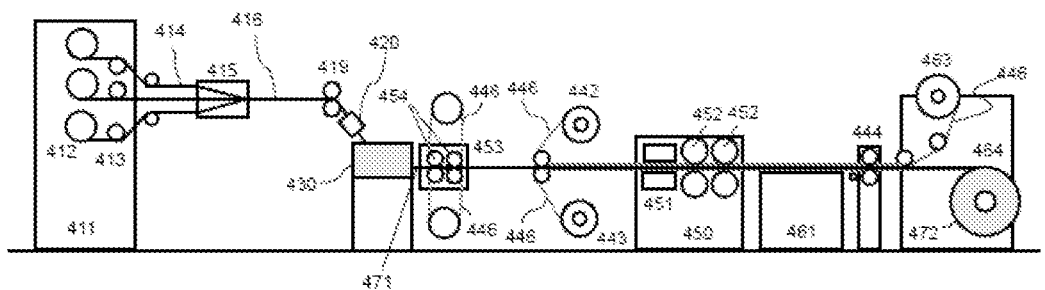
FIG. 28 is a schematic diagram of an example of another process/apparatus for producing a prepreg using the present invention.

In this illustration, a simplified additional-impregnation process and a resin film lamination process carried out thereafter will be described. The coating section can be the same as in the illustration 2, and the prepreg production apparatus that can be used is the same as depicted in FIG. 28.

A primary impregnate prepreg can be obtained by coating the reinforcing fiber sheet mentioned in the illustration 2 with the matrix resin A also mentioned in the illustration 2 at 80 to 100° C. Then, an additional-impregnation process is carried out in an additional-impregnation device installed immediately after the coating section, thus enabling the degree of impregnation to be increased so that the impregnation ratio based on a water absorption rate can be 3 to 15%. When this is done, the simplified additional-impregnation device can be a multi-stage nip roll, and in addition, a release sheet can be inserted on the nip roll. In addition, this release sheet is allowed to circuit. The impregnation ratio based on a water absorption rate can be calculated from a change in a mass in accordance with a method described in Japanese Translation of PCT International Application Publication No. JP-T-2016-510077, wherein one side of a prepreg cut to 10 cm ×10 cm is immersed by 5 mm in water for five minutes, causing the change in the mass. Then, a resin film(s) is/are laminated on one face or both faces of the prepreg having a high degree of impregnation, and this resulting prepreg is introduced into an additional-impregnation machine, in which the impregnation ratio can be adjusted to 0.1 to 15%. The running speed of the reinforcing fiber sheet and the prepreg can be 5 to 25 m/minute.

For example, a prepreg can be produced with a coating section having a first-tier taper at an opening angle of 17° and a second-tier taper at an opening angle of 7°, with H=70 mm and L2−W=0 mm, with the matrix resin A temperature set to 90° C. in the coating section, with the surface temperature of the nip roll in the simplified additional-impregnation device set to 100° C., with use of a resin film which is a laminate of the below-mentioned matrix resin B film and a release sheet, and with the running speed of the reinforcing fiber sheet and the prepreg set to 20 m/minute. The prepreg enables the impregnation ratio based on a water absorption rate to be approximately 5%. Here, the matrix resin B is a thermosetting epoxy resin composition, which is obtained by adding "particle 3" (having a Tg of 150° C.) described in EXAMPLES in JP2011-162619A as polymer particles to a mixture of an epoxy resin (a mixture of an aromatic amine type of epoxy resin and a bisphenol type of epoxy resin), a hardener (diaminodiphenyl sulfone), and polyethersulfone, such that the polymer particles account for 13 mass % of the whole mass of the resin composition as 100 mass %. The viscosity of this resin is 118 Pa·s at 75° C., 32 Pa·s at 90° C., and 10 Pa·s at 105° C. as measured at a measurement frequency of 0.5 Hz at a temperature ramp rate of 1.5° C./minute. This matrix resin B formed into a resin film by a known method can be used.

Such polymer particle-containing prepregs are laminated in six layers, and cured using an autoclave at 180° C. at 6 kgf/cm² (0.588 MPa) for two hours so that a CFRP can be obtained. The CFRP is enabled to have a tensile strength of approximately 3.0 GPa, and can be said to have suitable mechanical properties as a structural material for the aerospace. In this regard, the tensile strength of a CFRP is measured in the same manner as in WO2011/118106, and the value resulting from normalizing the volume % of the reinforcing fibers in the prepreg to 56.5% can be used. In addition, the cross-section of the resulting CFRP exhibits reinforcing fiber layers orderly laminated in the horizontal direction and a matrix resin layer formed between a reinforcing fiber layer and a reinforcing fiber layer, and furthermore, most of the polymer particles can be arranged between these reinforcing fiber layers. This state can be verified by observing the cross-section of the CFRP with an electron microscope or the like.

In this regard, a prepreg is produced by a conventional hot-melt process using the carbon fiber and the matrix resin A, and the resulting prepreg is cured using an autoclave at 180° C. at 6 kgf/cm² (0.588 MPa) for two hours to yield a CFRP, which is found to have a tensile strength of approximately 2.9 GPa.

<Illustration 4: Thermoplastic Prepreg Tape (1)>

Figure 29:
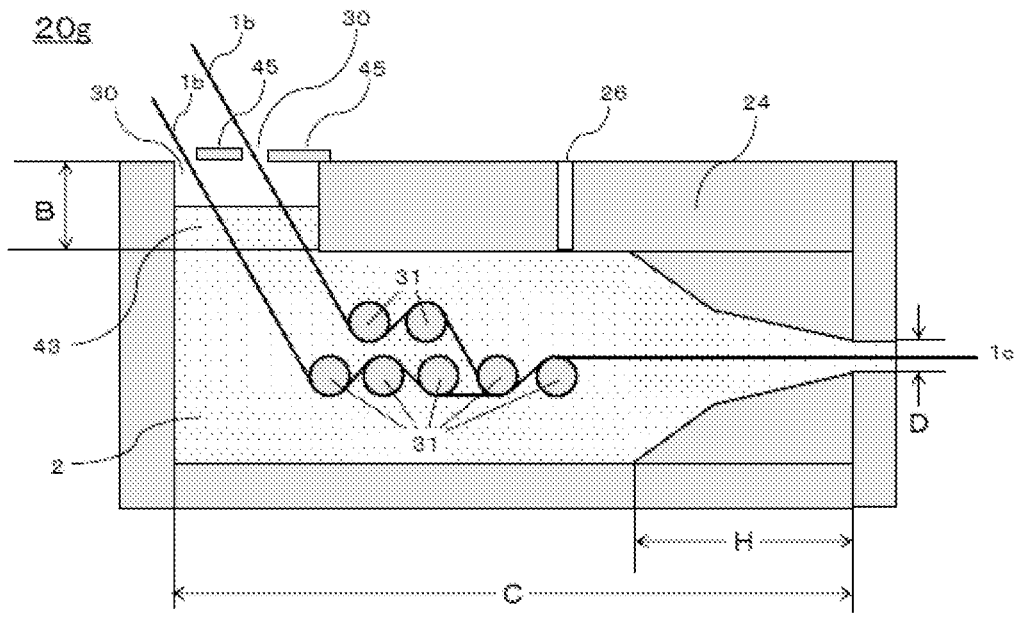
FIG. 29 is a detailed cross-sectional view of the coating section 20g according to an embodiment other than in FIG. 9.

Using the coating section 20g depicted in FIG. 29 makes it possible that a plurality of reinforcing fiber sheets are allowed to pass through a plurality of diverting members included in the liquid pool, thus undergo an initial impregnation process, and are laminated and integrated, furthermore that the matrix resin to be applied in the narrowed section is used for measurement and impregnation, and also that the cross-section of the prepreg is shaped. In cases where a matrix resin composed mainly of a thermoplastic resin is used, particularly in cases where super engineering plastics having high heat resistance are used, a high-temperature process in particular is required in the impregnation process. Because of this, carrying out the impregnation process sufficiently in the coating section is effective in order to decrease the load in the additional-impregnation process. Suitable examples thereof include a coating section depicted in FIG. 29. In addition, the inside of the coating section is preferably filled with inert gas such as nitrogen or argon in order to inhibit thermal degradation and oxidative decomposition. For this purpose, a sealing member is preferably provided at the opening to the extent that the reinforcing fiber sheet has no problem with running.

Figure 30:
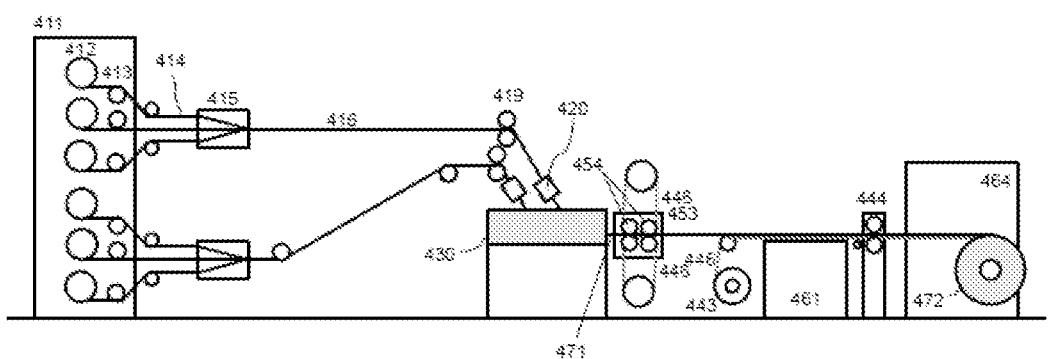
FIG. 30 is a schematic diagram of an example of another process/apparatus for producing a prepreg using the present invention.

To produce a thermoplastic prepreg tape, the coating section 20g depicted in FIG. 29 has a first-tier taper at an opening angle of 15 to 20° and a second-tier taper at an opening angle of 5 to 10°; H=50 to 70 mm, L2−W=0 to 1 mm, B=30 to 70 mm, and C=250 to 350 mm are satisfied; the coating section is filled with nitrogen; and a degassing mechanism can also be used. In addition, an apparatus depicted in FIG. 23 can be used as a prepreg production apparatus. The depiction of FIG. 30 shows that three yarns of reinforcing fiber are arranged to form one reinforcing fiber sheet, and that two such sheets are used to produce a prepreg, but obviously, the number of reinforcing fiber bobbins and that of reinforcing fiber sheets can be changed suitably. For example, carbon fiber ("TORAYCA (registered trademark)" T800S (24K), manufactured by Toray Industries, Inc.) is used as reinforcing fiber, three yarns of the fiber are used to form one reinforcing fiber sheet, and two such sheets are used to produce a prepreg having a width of 20 mm. In addition, a prepreg is produced with a low-viscosity polyamide 6 used as a matrix resin, and with the temperature of the matrix resin in the coating section set to 280 to 300° C. When this is done, the impregnation process can be completely carried out with nip rolls for simplified additional-impregnation arranged immediately after the coating section as depicted in FIG. 30 and with the surface temperature of the nip roll set to 200 to 250° C. The running speed of the reinforcing fiber sheet and the prepreg can be 5 to 20 m/minute. A molded thermoplastic prepreg thus obtained has no void therein, and can achieve good mechanical characteristics. In the apparatus depicted in FIG. 30, a calendar roll and a pulling device can be arranged downstream of the simplified additional-impregnation device, as described, for example, in Patent Literature 3.

<Illustration 5: Thermoplastic Prepreg Tape (2)>

In the above-mentioned illustration 4, the matrix resin can be changed to super engineering plastics. For example, in cases where PEEK is used, the impregnation process can be completely carried out with the temperature of the matrix resin in the coating section set to 350 to 420° C. and with the surface temperature of the nip roll for simplified additional-impregnation set to 300 to 400° C. In addition, in cases where PEKK is used, the impregnation process can be completely carried out with the temperature of the matrix resin in the coating section set to 380 to 420° C. and with the surface temperature of the nip roll for simplified additional-impregnation set to 320 to 420° C. In addition, the running speed of the reinforcing fiber sheet and the prepreg can be 5 to 20 m/minute. A molded thermoplastic prepreg thus obtained has no void therein, and can achieve good mechanical characteristics and heat resistance.

EXAMPLES

<Prepreg Production Apparatus>

Figure 31:
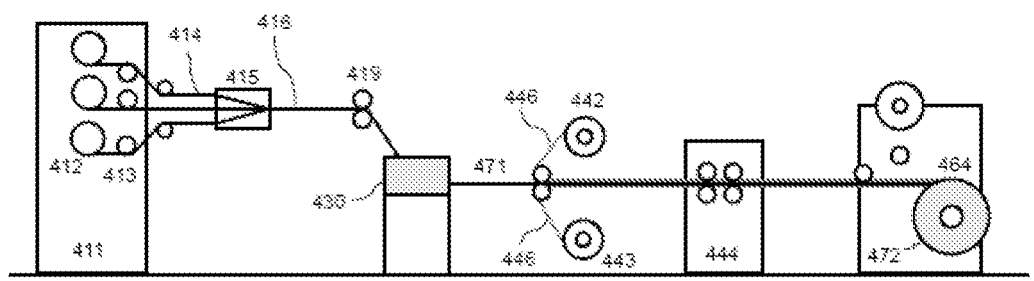
FIG. 31 is a schematic diagram of an example of another process/apparatus for producing a prepreg using the present invention.

An apparatus configured as described in FIG. 31 (the depiction of a resin supply section is omitted) was used as a prepreg production apparatus.

<Coating Section>

Figure 32:
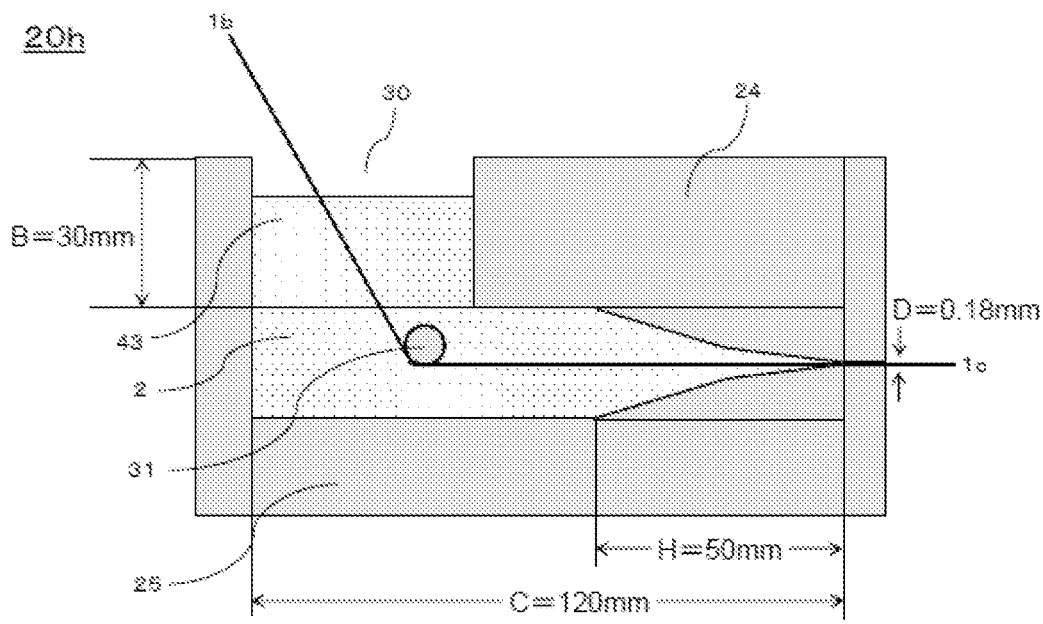
FIG. 32 is a detailed cross-sectional view of the coating section 20h according to an embodiment other than in FIG. 9.

A coating section of the type of the coating section 20h having the form depicted in FIG. 32 was used as a coating section, and the side face members of the coating section were produced from an acrylic resin plate so that the state of the inside could be observed. However, only the narrowed section was made of stainless steel. In addition, the running direction of the reinforcing fiber sheet was horizontal (0°) in the portion whose cross-sectional area decreased along the running direction of the reinforcing fiber sheet in the liquid pool. The liquid pool was tapered in two tiers, the opening angle of the first-tier taper was 17°, and the opening angle of the second-tier taper was 7°. In addition, plate-like bushes conformed to the internal shape of the coating section were provided as a width regulation mechanism, as described in FIGS. 8, and L2 was 20 mm. The gap D in the narrowed section was 0.18 mm. In addition, the space external to each bush was closed off at the outlet face of the narrowed section so that the matrix resin could not leak through the outlet of the narrowed section. In addition, the distance B between the lower face of the upper-side member and the upper face of the storage portion was 30 mm, wherein the member and the storage portion were constituents of the coating section. In addition, the horizontal length C of the liquid pool was 120 mm. In addition, a diverting member for adjusting the running direction of the reinforcing fiber sheet in the coating section was disposed upstream of the portion whose cross-sectional area decreased continuously in the liquid pool.

<Reinforcing Fiber Sheet>

A prepreg was produced using three yarns of carbon fiber ("TORAYCA (registered trademark)" T800S (24K), manufactured by Toray Industries, Inc.) as reinforcing fibers.

<Matrix Resin>

A bisphenol type epoxy resin ("jER (registered trademark)" 825, manufactured by Mitsubishi Chemical Corporation) was used as a matrix resin. The resin viscosity at room temperature was 4 to 7 Pa·s (values in the catalog).

<Prepreg Production Process>

Reinforcing fibers were withdrawn from reinforcing fiber bobbins fit onto creels, three reinforcing fiber yarns were arranged in the width direction by a reinforcing fiber arrangement device to form a reinforcing fiber sheet, and the resulting reinforcing fiber sheet was introduced into a coating section, so that the matrix resin was applied to the sheet. Then, a prepreg was withdrawn from the coating section, release sheets were applied to the prepreg from above and below, and the resulting prepreg was wound up. In addition, the running speed of the reinforcing fiber sheet and the prepreg were 20 m/minute.

<Evaluation of Continuous Running Properties>

To evaluate the continuous running properties of a reinforcing fiber sheet in the coating section, the reinforcing fiber sheet was run continuously for 30 minutes. One which caused no fuzz clogging nor yarn breaking was rated as "Good", and one which caused fuzz clogging and yarn breaking was rated as "Bad".

In addition, to evaluate a sign of fuzz clogging, the coating section was dismantled after each of the 60-minute and the 120-minute continuous running, the liquid contact surface of each of the wall constituent members was checked by visual observation for fuzz. The fuzz prevention properties were evaluated as follows: the fuzz prevention properties by virtue of which fuzz stuck to or to the vicinity of the narrowed section after the continuous running were rated as "Poor"; the fuzz prevention properties by virtue of which fuzz stuck to the portion far from the narrowed section 23 (on or near the boundary between the portion whose cross-sectional area does not decrease and the portion whose cross-sectional area decreases continuously) after the continuous running were rated as "Fair"; the fuzz prevention properties by virtue of which no fuzz stuck to the liquid contact surface of the upper-side member after the continuous running were rated "Good".

In addition, the reinforcing fiber sheet was run continuously at a running speed of 20 m/minute for 60 minutes, and a measurement was made of the time during which the reinforcing fiber sheet was run uniformly without having any split of the fiber bundle (parts at which the sheet-like carbon fiber bundle was torn in streaks) or any edge folding of the fiber bundle (parts at which the carbon fiber bundle was folded over) immediately above the liquid pool. The reinforcing fiber sheet that was run uniformly without any split of the fiber bundle or any edge folding of the fiber bundle during the time the ratio of which was 90% or more of the whole running time was rated as "Excellent", 50% or more and less than 90% "Good", 10% or more and less than 50% "Fair", less than 10% "Poor".

<Evaluation of Degree of Impregnation (Peeling Method)>

A sampled prepreg was sandwiched between adhesive tapes, these were peeled off, and the reinforcing fiber to which the matrix resin stuck and the reinforcing fiber to which the matrix resin did not stick were separated. Then, the ratio of the mass of the reinforcing fiber to which the matrix resin stuck with respect to the mass of the whole reinforcing fiber sheet that was used was determined by a peeling method, and regarded as an impregnation ratio of the matrix resin.

Examples 1 to 3

A prepreg was produced with the taper length (i.e., H) and the value of L2−W changed as in Table 1. This has revealed that the larger the value of H, the better the fuzz prevention properties, and that the smaller the value of L2−W, the more unlikely it is that splitting and edge folding of the reinforcing fiber sheet are caused.

In addition, the impregnation ratio based on a peeling method was 50 to 60% in any of the Examples, revealing that the impregnation process was well carried out in the coating section.

Comparative Example 1

A prepreg was produced with 12 mm as the value of L2−W as described in Table 1, with the result that splitting and edge folding of the reinforcing fiber sheet were caused.

Comparative Example 2

Using a coating section having no portion whose cross-sectional area decreased continuously (H=0), an attempt was made to produce a prepreg under the conditions listed in Table 1 and in the same manner as in Example 1, but the reinforcing fiber sheet stuck immediately after starting to run at 20 m/minute, showing poor continuous running properties.

INDUSTRIAL APPLICABILITY

The prepreg obtained by the production method according to the present invention can widely be applied as FRP typified by CFRP, in aerospace applications, applications for structural materials and interior materials such as for automobiles, trains, and ships, pressure vessels, industrial material applications, sports material applications, medical equipment applications, housing applications, civil engineering and construction applications, and the like.

REFERENCE SIGNS LIST

1a Reinforcing fiber
1b Reinforcing fiber sheet
1c Primary Impregnate Prepreg
1d Prepreg
2 Matrix Resin
3 Release Sheet
4 Resin Film
11 Creel
12 Reinforcing fiber Bobbin
13 Arrangement Device
14, 15 Conveyance Roll
16a, 16b Supply Device
17 Winder
20 Coating Section
21, 21a, 21b Wall Constituent Members
22 Liquid Pool
22a Portion whose cross-sectional area does not decrease in Liquid Pool
22b Portion whose cross-sectional area decreases continuously in Liquid Pool

TABLE 1

|  |  | Example 1 | Example 2 | Example 3 | Comparative Example 1 | Comparative Example 2 |
|---|---|---|---|---|---|---|
| Performing Conditions | L2−W (mm) | 0 | 0 | 0 | 12 | 0 |
|  | Length H along which Cross-sectional Area Decreases Continuously (mm) | 50 | 25 | 8 | 50 | 0 |
| Evaluation Items | Continuous Running Properties | Good | Good | Good | Good | Bad |
|  | Fuzz Prevention Properties (60 minutes) | Good | Good | Fair | Good | — |
|  | Fuzz Prevention Properties (120 minutes) | Good | Fair | Fair | Fair | — |
|  | Split of Reinforcing fiber sheet | Excellent | Excellent | Excellent | Fair | — |
|  | Edge Folding of Reinforcing fiber sheet | Excellent | Excellent | Excellent | Fair | — |

Example 4

Reinforcing fibers were withdrawn from reinforcing fiber bobbins fit onto creels, and three reinforcing fiber yarns were arranged in the thickness direction by the reinforcing fiber arrangement device to produce a prepreg in the same manner as in Example 1 (L2−W=0). Here, L2 was 7 mm. In addition, the gap D in the narrowed section was 0.5 mm. The results of evaluation of the running properties were Good for all of the continuous running properties and the fuzz prevention properties (for 60 minutes and 120 minutes), and both of splitting and edge folding of the reinforcing fiber sheet were Excellent.

22c Portion whose cross-sectional area decreases intermittently in Liquid Pool
23 Narrowed Section
24 Upper-side member
25 Lower-side member
26 Degassing Mechanism
27 Side Face Member
28 Outlet
29 Outlet Side Member
30 Opening
31 Diverting Member
32 Side Wall Member
33 Gap between Reinforcing fiber sheet 1b and Side Wall Member 32

34, 34a, 34b Width Regulation Mechanism
40 Coating Section in Embodiment other than of Present Invention
41 Liquid Pool
42 Boundary
43 Storage Portion
44 Liquid Surface
45 Sealing Member
100 Coating Device
B Distance Defined by Upper Side of Liquid Pool 22 and Upper Side of Storage Portion 43
C Length of Liquid Pool
D Gap
G Position at which width regulation is carried out
H Length of Portion 22b whose cross-sectional area decreases continuously in Liquid Pool
L Width of Liquid Pool 22
R, Ra, Rb Circular Stream in the Edge
T Circular Streams
U Width of Narrowed Section 23
W Width of Primary Impregnate Prepreg 1c, as measured immediately under Narrowed Section 23
X Running Direction of Reinforcing fiber sheet
Y Direction perpendicular to X and Z
Z Vertically Downward Direction
θ Opening Angle of Tapered Portion
411 Creel
412 Reinforcing fiber Bobbin
413 Diverting Guide
414 Reinforcing fiber
415 Reinforcing fiber Arrangement Device
416 Reinforcing fiber sheet
417 Fiber Bundle Widening Device
418 Smoothing Device
419 Conveyance Roll
420 Reinforcing fiber sheet Preheating Device
430 Coating Section
431 First Coating Section
432 Second Coating Section
442 Supply Device (Upper)
443 Supply Device (Lower)
444 High Tension Take-up Device
445 Diverting Roll
446 Resin Film or Release Sheet
447 Lamination Roll
450 Additional-impregnation Device
451 Hot Plate
452 Heated Nip Roll
453 Simplified Additional-impregnation Device
454 Heated Nip Roll
455 Heated S-shaped Arranged Roll
456 Contact Roll
461 Cooling Device
462 Take-up Device
463 Release Sheet (Upper) Wind-up Device
464 Winder
471 Primary Impregnate Prepreg
472 Prepreg/Release Sheet (Sheet-like Integrated Object)

The invention claimed is:

1. A coating device for applying a matrix resin to a reinforcing fiber sheet, comprising:
a running mechanism which allows the reinforcing fiber sheet to run horizontally or slantingly; and
a coating section,
wherein said coating section is capable of storing a matrix resin in the inside thereof, and further includes a liquid pool and a narrowed section which are in communication with each other,
wherein said liquid pool has a portion whose cross-sectional area decreases continuously along a running direction of said reinforcing fiber sheet,
wherein said narrowed section has a slit-like cross-section and has a smaller cross-sectional area than the largest cross-sectional area of said liquid pool, and
wherein said coating section further comprises a width regulation mechanism which regulates to satisfy a relationship between a width (W) of the reinforcing fiber sheet at the outlet of the narrowed section and a width (L2) regulated by the width regulation mechanisms at the outlet side end of the width regulation mechanism of L2≤W+10 (mm).

2. The coating device according to claim 1, wherein the upper portion of said coating section has an opening through which said reinforcing fiber sheet is allowed to pass.

3. The coating device according to claim 1, an opening angle of the portion whose cross-sectional area decreases continuously along a running direction of said reinforcing fiber sheet is an acute angle.

4. The coating device according to claim 1, the portion whose cross-sectional area decreases continuously along a running direction of said reinforcing fiber sheet is an acute angle has a form of a two-tier taper.

5. A prepreg production apparatus comprising:
a rack on which a reinforcing fiber or a reinforcing fiber fabric is hung;
said coating device according to claim 1; and
a winder for winding up a prepreg.

* * * * *